United States Patent
Higashi et al.

(10) Patent No.: US 8,867,064 B2
(45) Date of Patent: Oct. 21, 2014

(54) IMAGE FORMING APPARATUS HAVING HUMAN-BODY COMMUNICATION FUNCTION AND METHOD FOR AUTHENTICATION IN IMAGE FORMING APPARATUS

(75) Inventors: Toshikazu Higashi, Toyokawa (JP); Tatsuya Eguchi, Toyohashi (JP); Tatsutoshi Yamada, Toyokawa (JP); Hiroshi Eguchi, Nagoya (JP)

(73) Assignee: Konica Minolta, Inc., Tokyo (JP)

( * ) Notice: Subject to any disclaimer, the term of this patent is extended or adjusted under 35 U.S.C. 154(b) by 1375 days.

(21) Appl. No.: 12/359,864

(22) Filed: Jan. 26, 2009

(65) Prior Publication Data

US 2009/0316186 A1 Dec. 24, 2009

(30) Foreign Application Priority Data

Jun. 18, 2008 (JP) ................................. 2008-159415

(51) Int. Cl.
*H04L 9/32* (2006.01)
*G06K 1/00* (2006.01)
*G06F 21/35* (2013.01)
*G06F 21/60* (2013.01)

(52) U.S. Cl.
CPC *H04L 9/32* (2013.01); *G06F 21/35* (2013.01); *G06F 21/608* (2013.01)
USPC .......................................... 358/1.15; 726/20

(58) Field of Classification Search
USPC ........................................................ 358/1.15
See application file for complete search history.

(56) References Cited

U.S. PATENT DOCUMENTS

| | | | |
|---|---|---|---|
| 7,069,187 B2 | 6/2006 | Kondo et al. | |
| 7,202,773 B1 * | 4/2007 | Oba et al. ...................... | 340/5.8 |
| 2003/0191594 A1 | 10/2003 | Kondo et al. | |
| 2006/0239421 A1 | 10/2006 | Ishibashi et al. | |
| 2007/0014442 A1 | 1/2007 | Yu | |
| 2007/0061573 A1 | 3/2007 | Dokuni et al. | |
| 2007/0201071 A1 * | 8/2007 | Yamada et al. .............. | 358/1.13 |

FOREIGN PATENT DOCUMENTS

| | | |
|---|---|---|
| JP | 2001-195368 A | 7/2001 |
| JP | 2001-255795 | 9/2001 |
| JP | 2002-222169 A | 8/2002 |
| JP | 2002-278938 A | 9/2002 |
| JP | 2003-8808 | 1/2003 |

(Continued)

OTHER PUBLICATIONS

Japanese Decision to Grant Patent mailed May 17, 2011, directed to counterpart application No. JP-2008-159415; 6 pages.

(Continued)

*Primary Examiner* — Qian Yang
(74) *Attorney, Agent, or Firm* — Lucas & Mercanti, LLP

(57) ABSTRACT

When a key input unit or a touch panel is pressed, a control unit identifies the commanded function. Then, the control unit causes a human-body communication unit to start processing for establishing human-body communication with a portable device worn by a user. On receiving user information from the portable device, the control unit makes reference to an authentication table and determines whether or not there is an entry for the received user information therein. Further, the control unit determines whether or not use of the identified function, out of the functions corresponding to the received user information, is allowed. The control unit performs display on the touch panel, according to the result of the determination.

10 Claims, 17 Drawing Sheets

(56) References Cited

FOREIGN PATENT DOCUMENTS

| JP | 2003-58504 | 2/2003 |
| JP | 2006-229553 | 8/2006 |
| JP | 2006-260085 | 9/2006 |
| JP | 2006-268614 | 10/2006 |
| JP | 2007-18346 | 1/2007 |
| JP | 2007-79684 | 3/2007 |
| JP | 2007-88945 | 4/2007 |
| JP | 2007-137211 | 6/2007 |

OTHER PUBLICATIONS

Japanese Notice of Grounds for Rejection mailed Oct. 19, 2010, directed to JP-2008-159415; 9 pages.

Japanese Notice of Grounds of Rejection mailed May 11, 2010, directed to corresponding Japanese Patent Application No. 2008-159415; 7 pages.

* cited by examiner

SELECTION OF TRANSMISSION DESTINATION

FIG.11

| USER ID | 00001 |

| CLASS 1 | CLASS 2 | CLASS 3 | 00001 | 00002 | 00003 | ... | |
|---|---|---|---|---|---|---|---|
| | USER ID | | 00001 | 00002 | 00003 | ... | |
| COPY | COLOR | COLOR | Y | Y | Y | | |
| | | BLACK | — | Y | Y | | |
| | PAPER SHEET | TRAY 1 (NEW) | — | Y | Y | | |
| | | TRAY 2 (RECYCLED) | Y | Y | Y | | |
| | FINISHING | PUNCHED | Y | Y | Y | | |
| | | STAPLED | — | Y | Y | | |
| | SINGLE SIDED/ DOUBLE SIDED | SINGLE SIDED | Y | Y | Y | | |
| | | DOUBLE SIDED | Y | Y | Y | | |
| | : | : | | | | | |
| FAX | TRANSMISSION DESTINATION | GROUP ABC | Y | Y | — | | |
| | | GROUP DEF | Y | — | — | | |
| | | GROUP GHI | Y | — | — | | |
| | SETTING OF READING | NORMAL | Y | Y | — | | |
| | | FINE | — | Y | — | | |
| | | SUPER-FINE | — | Y | — | | |
| | : | : | | | | | |
| PRINT | COLOR | COLOR | — | Y | Y | | |
| | | BLACK | Y | Y | Y | | |
| | PAPER SHEET | TRAY 1 (NEW) | — | Y | Y | | |
| | | TRAY 2 (RECYCLED) | Y | Y | Y | | |
| | FINISHING | PUNCHED | — | Y | Y | | |
| | | STAPLED | — | Y | Y | | |
| | SINGLE SIDED/ DOUBLE SIDED | SINGLE SIDED | Y | Y | Y | | |
| | | DOUBLE SIDED | — | Y | Y | | |
| | : | : | | | | | |

FIG.13
| USER ID | USER NAME |
|---------|-----------|
| 00001 | AAA |
| 00002 | BBB |
| 00003 | CCC |
| ⋮ | ⋮ |
FIG.14A
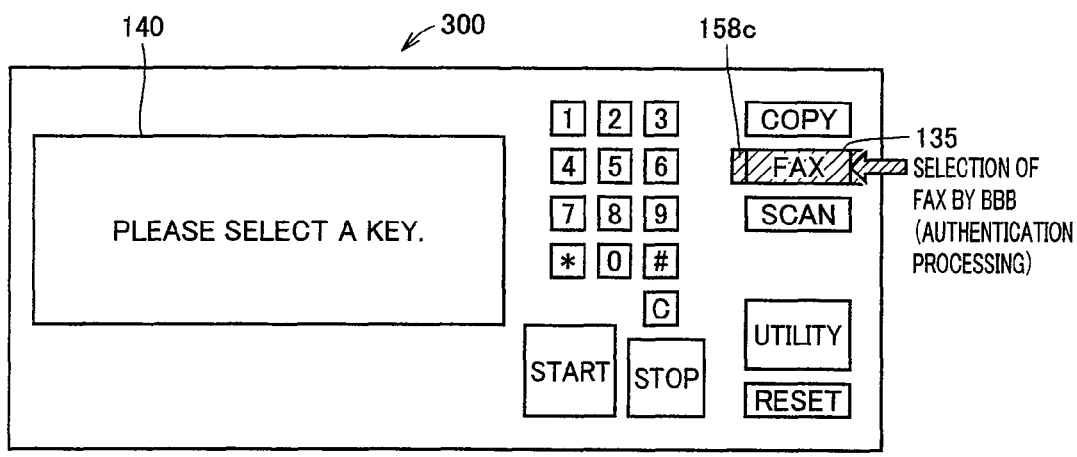
FIG.14B
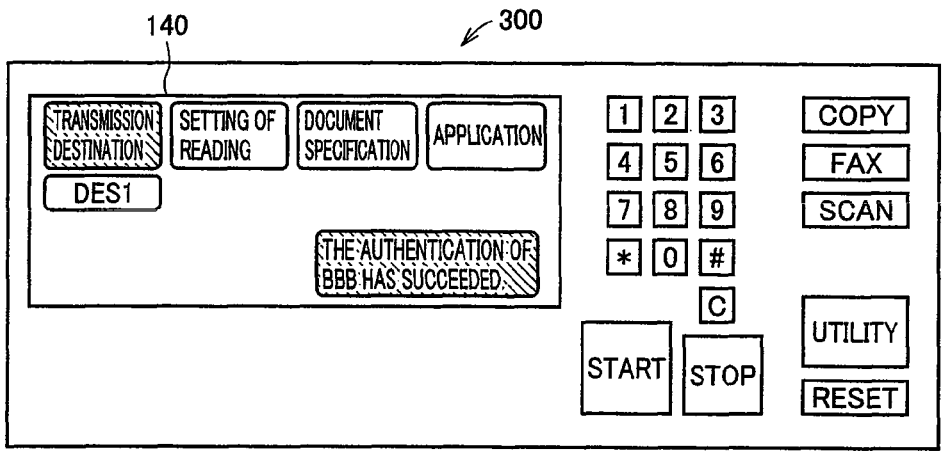

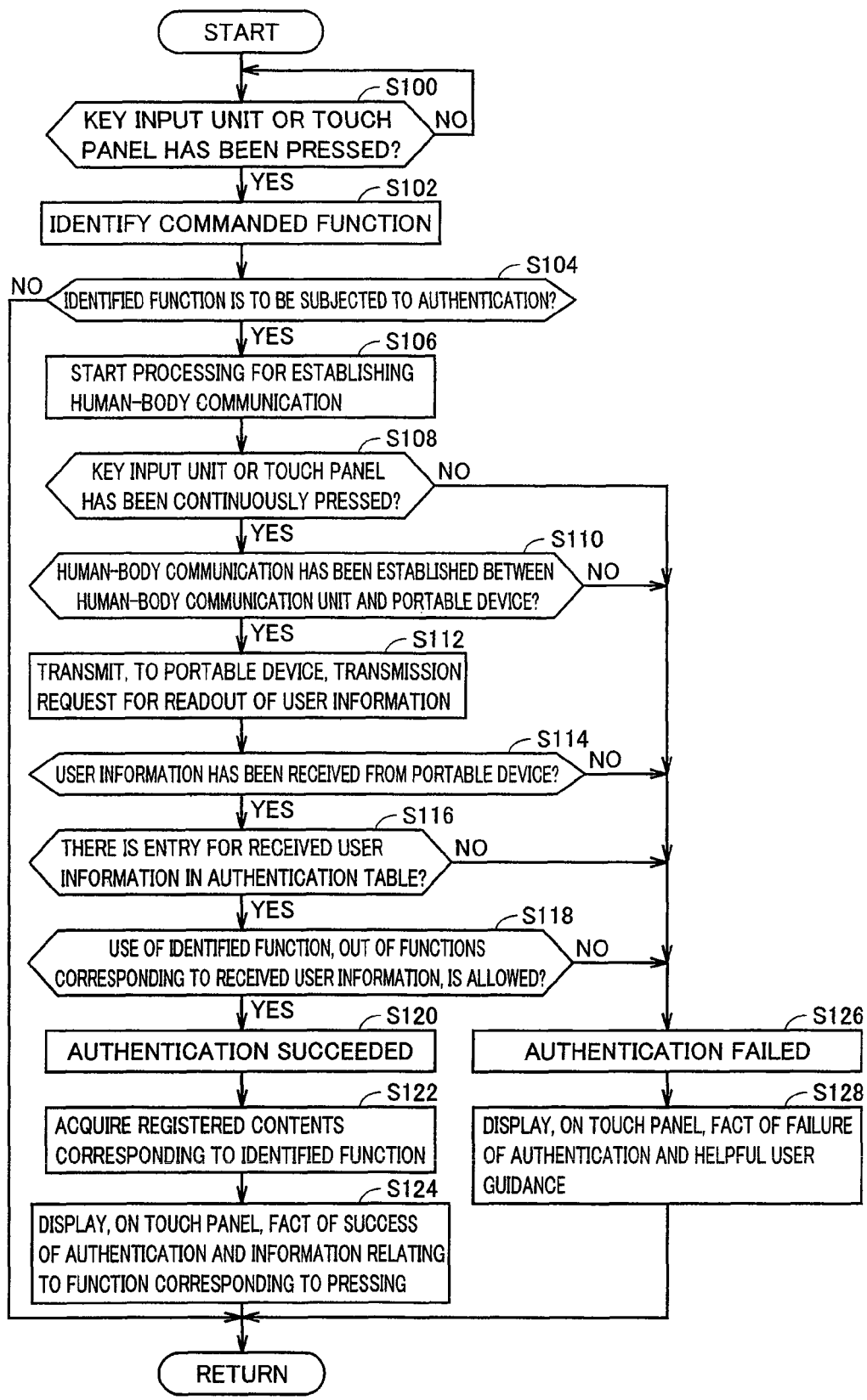

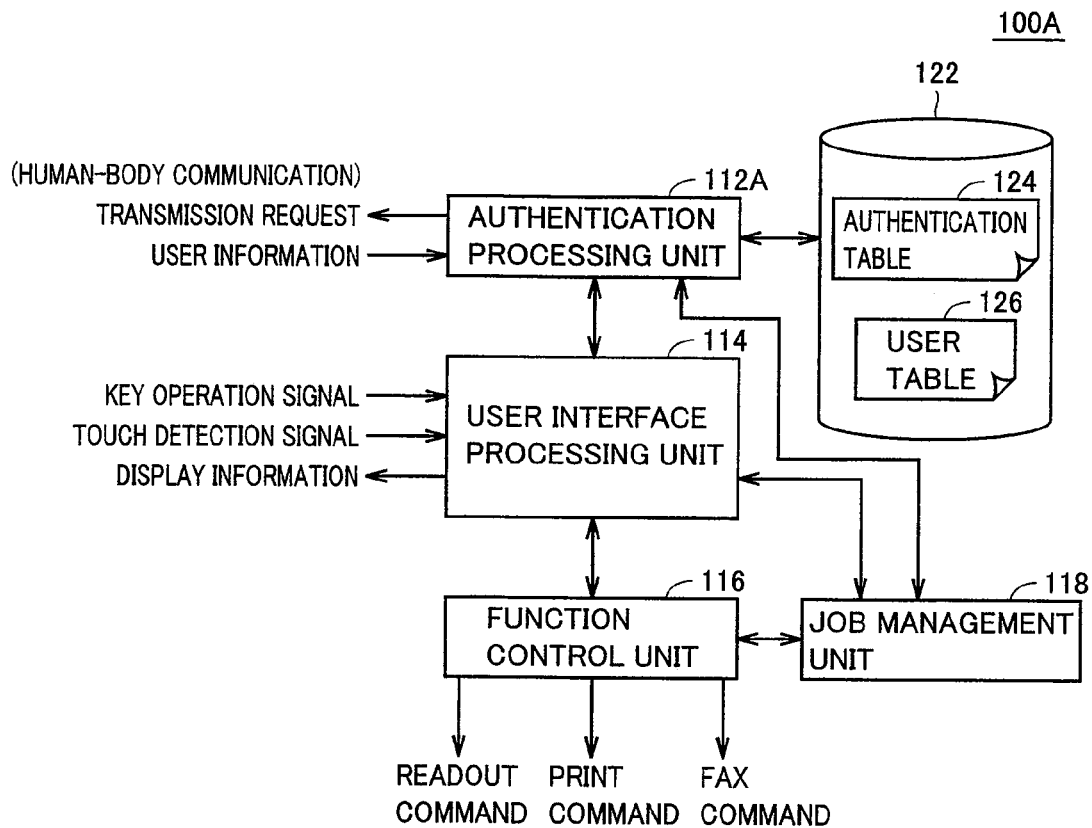

FIG.20

| ATTRIBUTE | | | 0000A | 0000B | 0000C | ... | |
|---|---|---|---|---|---|---|---|
| CLASS 1 | CLASS 2 | CLASS 3 | | | | | |
| COPY | COLOR | COLOR | Y | Y | Y | | |
| | | BLACK | — | Y | Y | | |
| | PAPER SHEET | TRAY 1 (NEW) | — | Y | Y | | |
| | | TRAY 2 (RECYCLED) | Y | Y | Y | | |
| | FINISHING | PUNCHED | Y | Y | Y | | |
| | | STAPLED | — | Y | Y | | |
| | SINGLE SIDED/ DOUBLE SIDED | SINGLE SIDED | Y | Y | Y | | |
| | | DOUBLE SIDED | Y | Y | Y | | |
| | ⋮ | | | | | | |
| FAX | TRANSMISSION DESTINATION | GROUP ABC | Y | Y | — | | |
| | | GROUP DEF | Y | — | — | | |
| | | GROUP GHI | Y | — | — | | |
| | SETTING OF READING | NORMAL | Y | Y | — | | |
| | | FINE | — | Y | — | | |
| | | SUPER-FINE | — | Y | — | | |
| | ⋮ | | | | | | |
| PRINT | COLOR | COLOR | — | Y | Y | | |
| | | BLACK | Y | Y | Y | | |
| | PAPER SHEET | TRAY 1 (NEW) | — | Y | Y | | |
| | | TRAY 2 (RECYCLED) | Y | Y | Y | | |
| | FINISHING | PUNCHED | — | Y | Y | | |
| | | STAPLED | — | Y | Y | | |
| | SINGLE SIDED/ DOUBLE SIDED | SINGLE SIDED | Y | Y | Y | | |
| | | DOUBLE SIDED | — | Y | Y | | |
| | ⋮ | | | | | | |

FIG.21

| USER ID | 00001 | 00002 | 00003 | ... | |
|---|---|---|---|---|---|
| ACCESS PRIVILEGE | GRANTED | GRANTED | NOT GRANTED | ... | |

FIG.22

| USER ID | 00001 | PASSWORD | 123456 |

FIG.23

| CLASS 1 | CLASS 2 | CLASS 3 | USER ID | 00001 | 00002 | 00003 | ... | |
|---|---|---|---|---|---|---|---|---|
| COPY | COLOR | COLOR | | Y | Y | Y | | |
| | | BLACK | | — | Y | Y | | |
| | PAPER SHEET | TRAY 1 (NEW) | | — | Y | Y | | |
| | | TRAY 2 (RECYCLED) | | Y | Y | Y | | |
| | FINISHING | PUNCHED | | Y | Y | Y | | |
| | | STAPLED | | — | Y | Y | | |
| | SINGLE SIDED/ DOUBLE SIDED | SINGLE SIDED | | Y | Y | Y | | |
| | | DOUBLE SIDED | | Y | Y | Y | | |
| | ⋮ | | | | | | | |
| FAX | TRANSMISSION DESTINATION | GROUP ABC | | Y | Y | — | | |
| | | GROUP DEF | | Y | — | — | | |
| | | GROUP GHI | | Y, PASSWORD = 123456 | Y, PASSWORD = 123456 | — | | |
| | SETTING OF READING | NORMAL | | Y | Y | — | | |
| | | FINE | | — | Y | — | | |
| | | SUPER-FINE | | — | Y | — | | |
| | ⋮ | | | | | | | |
| PRINT | COLOR | COLOR | | — | Y | Y | | |
| | | BLACK | | Y | Y | Y | | |
| | PAPER SHEET | TRAY 1 (NEW) | | — | Y | Y | | |
| | | TRAY 2 (RECYCLED) | | Y | Y | Y | | |
| | FINISHING | PUNCHED | | — | Y | Y | | |
| | | STAPLED | | — | Y | Y | | |
| | SINGLE SIDED/ DOUBLE SIDED | SINGLE SIDED | | Y | Y | Y | | |
| | | DOUBLE SIDED | | — | Y | Y | | |
| | ⋮ | | | | | | | |

FIG.24

| USER ID | 00001 | JOB REGISTRATION CODE | 123456 |

FIG.25

| CLASS 1 | CLASS 2 | CLASS 3 | USER ID | 00001 | 00002 | 00003 | ... | |
|---|---|---|---|---|---|---|---|---|
| COPY | COLOR | COLOR | | Y | Y | Y | | |
| | | BLACK | | — | Y | Y | | |
| | PAPER SHEET | TRAY 1 (NEW) | | — | Y | Y | | |
| | | TRAY 2 (RECYCLED) | | Y | Y | Y | | |
| | FINISHING | PUNCHED | | Y | Y | Y | | |
| | | STAPLED | | — | Y | Y | | |
| | SINGLE SIDED/ DOUBLE SIDED | SINGLE SIDED | | Y | Y | Y | | |
| | | DOUBLE SIDED | | Y | Y | Y | | |
| | ⋮ | | | | | | | |
| FAX | TRANSMISSION DESTINATION | GROUP ABC | | Y, JOB REGISTRATION CODE = 789101 | Y, JOB REGISTRATION CODE = 789101 | — | | |
| | | GROUP DEF | | Y | — | — | | |
| | | GROUP GHI | | Y, JOB REGISTRATION CODE = 123456 | Y, JOB REGISTRATION CODE = 123456 | — | | |
| | SETTING OF READING | NORMAL | | Y | Y | — | | |
| | | FINE | | — | Y | — | | |
| | | SUPER-FINE | | — | Y | — | | |
| | ⋮ | | | | | | | |
| PRINT | COLOR | COLOR | | — | Y | Y | | |
| | | BLACK | | Y | Y | Y | | |
| | PAPER SHEET | TRAY 1 (NEW) | | — | Y | Y | | |
| | | TRAY 2 (RECYCLED) | | Y | Y | Y | | |
| | FINISHING | PUNCHED | | — | Y | Y | | |
| | | STAPLED | | — | Y | Y | | |
| | SINGLE SIDED/ DOUBLE SIDED | SINGLE SIDED | | Y | Y | Y | | |
| | | DOUBLE SIDED | | — | Y | Y | | |
| | ⋮ | | | | | | | |

IMAGE FORMING APPARATUS HAVING HUMAN-BODY COMMUNICATION FUNCTION AND METHOD FOR AUTHENTICATION IN IMAGE FORMING APPARATUS

This application is based on Japanese Patent Application No. 2008-159415 filed with the Japan Patent Office on Jun. 18, 2008, the entire content of which is hereby incorporated by reference.

BACKGROUND OF THE INVENTION

1. Field of the Invention

The present invention relates to an image forming apparatus having a human-body communication function and a method for authentication in the image forming apparatus and, more particularly, to a technique for performing authentication using human-body communication.

2. Description of the Related Art

For the sake of efficiently performing tasks, there has been widespread use of a multi function peripheral (hereinafter, also referred to as MFP) having a plurality of functions, such as a printing function, a copying function, a facsimile function, and a scanning function. Such MFP may be caused to execute jobs of different functions (for example, a printing job and a facsimile transmission job) in parallel.

By the way, in offices and the like, there are needs for restricting the function allowed to be used, out of the functions provided in MFP, according to the contents of tasks for each user. For example, the use of all the functions is allowed for a user, whereas only a copying function is allowed for another user.

In order to provide such management, there have been employed mechanism for performing user authentication in MFP as well as for allowing the use of pre-defined functions, based on the result of the user authentication. In order to implement such user authentication, it is common to employ methods which require users to input a password.

As a user authentication method, instead of such methods requiring inputting of a password, there have also been proposed a method which requires each user to mount, to an MFP main body, a magnetic card or a memory unit storing his or her own user ID, before he or she operates the MFP.

Alternatively, there have been proposed a method which causes each user to carry a storage medium capable of wireless communication, such as an RFID (Radio Frequency IDentification) card or a non-contact type IC (Integrated Circuit) card (or a portable device incorporating a non-contact type IC card) and also causes an MFP to receive a user ID from the storage medium carried by the user within a predetermined area for performing user authentication. For example, Japanese Laid-Open Patent Publication No. 2007-137211 discloses a structure adapted such that, when a touch sensor detects a touch of a human-body on an operation knob of an engine activation switch, this will start an authentication operation in cooperation with an electronic key.

Further, as a method with improved security, there have been proposed a method which utilizes biometric authentication, such as fingerprint authentication and vein pattern authentication. For example, Japanese Laid-Open Patent Publication No. 2002-278938 discloses a structure which detects, as characteristic information, a change in electric resistance at a button position which is touched by a finger when the button is clicked and a change in three-dimensional shape of a palm covering the upper surface of a mouse when the mouse is clicked and, based on the characteristic information, performs authentication.

Further, Japanese Laid-Open Patent Publication Nos. 2001-195368 and 2002-222169 propose use of human-body communication for user authentication.

As described above, an MFP is capable of executing a plurality of functions in parallel, which may cause a plurality of users to generate commands for different functions to the MFP. In this case, there is a need for performing user authentication, at least on a function-by-function basis.

In dealing with the aforementioned needs, with the method which requires inputting of a password, users are required to input a password every time each user generates a command for a function, which is very cumbersome. Further, with the method which uses a magnetic card or a memory unit, it is necessary to provide the same number of reading devices as the number of users who can use the MFP at the same time, which complicates the structure and increases the cost. Further, with the method which uses a storage medium capable of wireless communication, it is impossible to identify which user has generated the command, when a plurality of storage media exist within the same communication area.

Further, the methods disclosed in Japanese Laid-Open Patent Publication Nos. 2001-195368 and 2002-222169 do not suggest performing further authentication once a successful user authentication has been made, and therefore, these methods do not satisfy the aforementioned needs for user authentication on a function-by-function basis as mentioned above.

SUMMARY OF THE INVENTION

The present invention was made in order to overcome the aforementioned problems and aims at providing an image forming apparatus capable of performing authentication on a per-function basis without bothering users, and at a method for authentication in an image forming apparatus.

An image forming apparatus according to an aspect of the present invention includes a display unit displaying operation information; an input unit receiving a user's command in response to touching thereon by the user; an electrode disposed on a surface of the input unit to be touched by the user; a human-body communication unit electrically connected to the electrode; a storage unit storing authentication information defining whether or not use of each function incorporated in the image forming apparatus is allowed, in association with the user information; and a control unit. The human-body communication unit reads user information from a portable device worn by the user, in response to touching on the electrode by the user. The control unit is operative to identify a commanded function when the user's command is inputted, to determine whether or not the use of the commanded function is allowed for the user information, by making reference to the authentication information, to provide the commanded function to the user, when the use of the commanded function is allowed, and to invalidate the user's command, when the use of the commanded function is not allowed.

According to another aspect of the present invention, there is provided a method for authentication in an image forming apparatus. The authentication method includes the steps of: providing authentication information defining whether or not use of each function incorporated in the image forming apparatus is allowed, in association with user information; displaying operation information on a display unit; receiving a user's command in response to touching on an input unit by the user; reading user information from a portable device worn by the user, through an electrode disposed on a surface of the input unit to be touched by the user; identifying a commanded function when the user's command is inputted; determining whether or not the use of the commanded function is allowed for the user information, by making reference to the authentication information; providing the commanded function to the user, when the use of the commanded function is allowed; and invalidating the user's command, when the use of the commanded function is not allowed.

According to the present invention, authentication on per-function basis can be performed without bothering the users.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 11 is an example of the data structure of user information transmitted from a portable device according to the first embodiment.

FIG. 12 is a diagram illustrating the data structure of an authentication table illustrated in FIG. 10.

FIG. 13 is a diagram illustrating the data structure of a user table illustrated in FIG. 10.

FIGS. 14A and 14B are diagrams illustrating exemplary user interfaces directed to a user registered with a user ID of "00002" in the authentication table illustrated in FIG. 12.

FIG. 16 is a flowchart illustrating a processing procedure relating to user authentication in the MFP according to the first embodiment.

FIG. 18 is a block diagram illustrating the control structure of the MFP according to the second embodiment.

FIG. 19 is a diagram illustrating the data structure of user information transmitted from a portable device according to a third embodiment.

FIG. 20 is a diagram illustrating the data structure of an authentication table stored in an MFP according to the third embodiment.

FIG. 21 is a diagram illustrating the data structure of an access-privilege setting table stored in the MFP according to the third embodiment.

FIG. 22 is a diagram illustrating the data structure of user information transmitted from a portable device according to a fourth embodiment.

FIG. 23 is a diagram illustrating the data structure of an authentication table stored in an MFP according to the fourth embodiment.

FIG. 24 is a diagram illustrating the data structure of user information transmitted from a portable device according to a fifth embodiment.

FIG. 25 is a diagram illustrating the data structure of an authentication table stored in an MFP according to the fifth embodiment.

DESCRIPTION OF THE PREFERRED EMBODIMENTS

Figure 1:
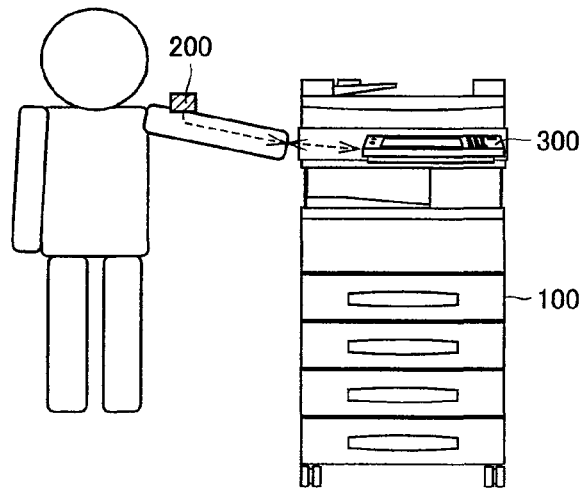
FIG. 1 is a diagram illustrating a usage pattern of an MFP according to a first embodiment.

Embodiments of the present invention will be described in detail with reference to the drawings. The same or corresponding components in the drawings will be designated by the same reference characters and the detailed description thereof will not be repeated.

First Embodiment

Entire System Structure

Hereinafter, as a representative example of an image forming apparatus according to the present invention, there will be described an MFP having a plurality of functions such as a facsimile function and a scanning function, in addition to an image forming function (monochrome and/or color) such as a printing function and a copying function.

Referring to FIG. 1, each user of an MFP 100 according to a first embodiment wears a portable device 200 which stores his or her own user information. MFP 100 is capable of communication with portable device 200 worn by each user, by using the human body of the user as a transmission medium (hereinafter, referred to as "human-body communication"). More specifically, an operation panel 300 which is a constituent of MFP 100 is provided with a touch panel and/or keys for receiving user's commands, and these touch panel and/or keys are provided, at their surfaces, with electrodes which implement human-body communication. This enables each user to establish human-body communication between MFP 100 and portable device 200 worn by the user, by pressing (touching) these touch panel and/or keys.

Figure 2:
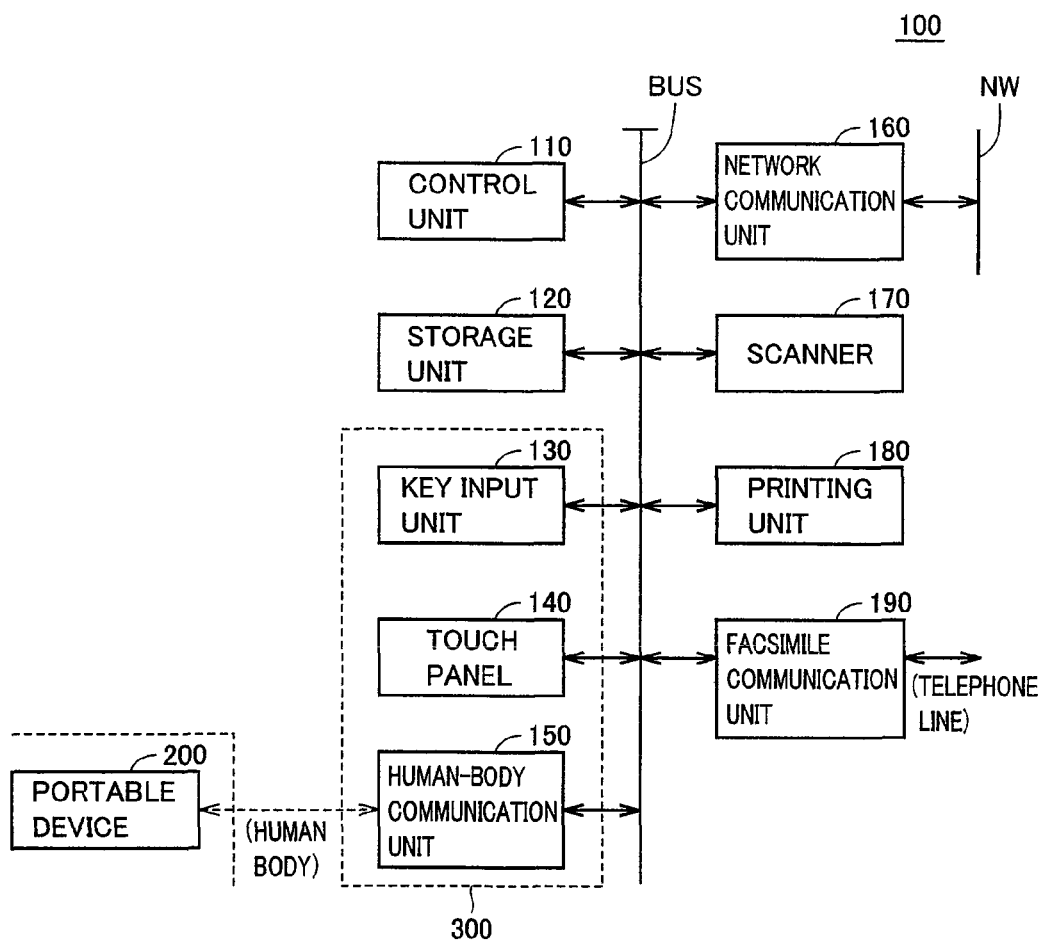
FIG. 2 is a block diagram illustrating the functional structure of the MFP according to the first embodiment.

Referring to FIG. 2, MFP 100 according to the first embodiment includes a control unit 110, a storage unit 120, a network communication unit 160, a scanner 170, a printing unit 180, a facsimile communication unit 190, and operation panel 300. These units are connected to one another through a data bus BUS in such a way as to enable data communication thereamong.

Control unit 110 includes an operation device such as a CPU (Central Processing Unit) representatively, and executes pre-stored programs for providing various types of processing according to the present embodiment.

Storage unit 120 includes a volatile memory such as a DRAM (Dynamic Random Access Memory) and a nonvolatile memory such as a flash memory, representatively. More specifically, storage unit 120 temporarily stores image data of documents read by scanner 170 and also stores the programs to be executed by control unit 110.

Network communication unit 160 performs data communication with other MFP and PC (personal computer) (not shown) over a network NW such as a LAN (Local Area Network). More specifically, network communication unit 160 transmits network facsimile data to another MFP and also receives print data from a PC.

Scanner 170 reads image information from documents to create image data. The image data is stored in storage unit 120. More specifically, scanner 170 directs light from a light source to a document placed on a platen glass and also receives light reflected by the document with an image pickup device to read image information from the document. Alternatively, in order to enable successive reading of documents, scanner 170 may be configured to include a document feeding table, a feeding roller, a resisting roller, a transfer drum, and a sheet ejection table, and the like.

Printing unit 180 forms (prints) images on paper media, from image data read by scanner 170 and/or image data received by network communication unit 160 or facsimile communication unit 190. Representatively, printing unit 180 is constituted by an image formation unit of an electrophotography type.

Facsimile communication unit 190 is connected to a telephone line and stores, in storage unit 120, facsimile data (image data) received from another MFP and the like. Further, facsimile communication unit 190 transmits facsimile data (image data) read by scanner 170 to a destination which a user inputted by touching operation panel 300.

Operation panel 300 is a user interface which provides, to users, operation information such as an operation menu and a job execution status and also receives user's commands according to pressing (touching) by a user. More specifically, operation panel 300 includes a key input unit 130 as an input unit, a touch panel 140 as an input unit configured integrally with a display unit, and a human-body communication unit 150.

As will be described later, key input unit 130 includes numeric keys and keys assigned to each of the functions (copying, facsimile, and the like) and outputs, to control unit 110, commands corresponding to a key pressed by a user.

Touch panel 140 is constituted by a liquid crystal display panel, and a touching-operation detection unit provided on this liquid crystal display panel. More specifically, touch panel 140 visibly displays various types of information for users and, on detecting touching operations by a user, outputs commands corresponding to these touching operations, to control unit 110.

Human-body communication unit 150 performs human-body communication with portable device 200 worn by each user, as described above.

(Configuration for Human-Body Communication)

Figure 3:
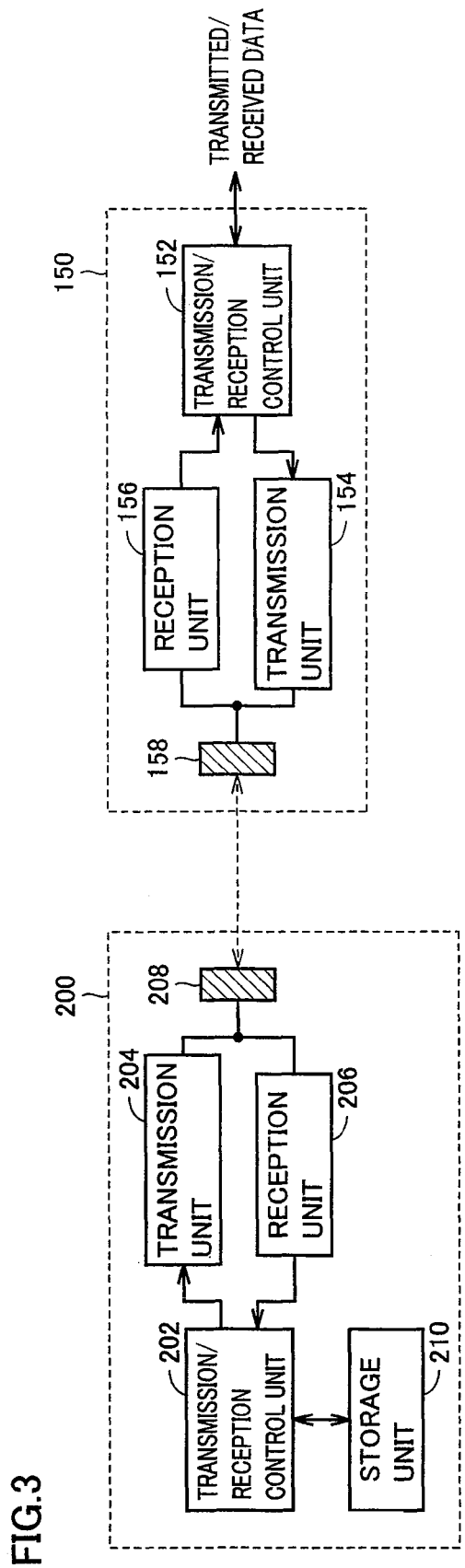
FIG. 3 is a block diagram illustrating, in more detail, the structures of a human-body communication unit and a portable device illustrated in FIG. 2.

Referring to FIG. 3, between human-body communication unit 150 and portable device 200, human-body communication unit 150 transmits, to portable device 200, a transmission request for readout of user information. In response to this transmission request, portable device 200 transmits, to human-body communication unit 150, the user information which has been previously stored in a storage unit 210. Prior to the transmission of this transmission request, a processing for establishing human-body communication connection therebetween may be executed.

Human-body communication unit 150 includes a transmission/reception control unit 152, a transmission unit 154, a reception unit 156, and an electrode 158.

Transmission/reception control unit 152 controls transmission unit 154 and reception unit 156. More specifically, transmission/reception control unit 152 outputs, to transmission unit 154, a message (such as the transmission request) transmitted thereto from control unit 110 (FIG. 2) through data bus BUS (FIG. 2) and also outputs, to control unit 110 (FIG. 2), a message (such as the user information) received by reception unit 156 through data bus BUS (FIG. 2). Transmission unit 154 transmits, to electrode 158, a signal created by modulating the transmitted message. Reception unit 156 demodulates the signal received from electrode 158 (the modulated signal) into received message and outputs them to transmission/reception control unit 152. Electrode 158 includes conductors disposed on the surfaces of key input unit 130 and touch panel 140 which are contacted by a user, so that, when a user presses operation panel 300, a human-body communication path is formed between electrode 158 and portable device 200 worn by the user. The configuration will be described in more detail later.

On the other hand, portable device 200 includes a transmission/reception control unit 202, a transmission unit 204, a reception unit 206, an electrode 208, and storage unit 210.

Transmission/reception control unit 202 has the same functions as those of transmission/reception control unit 152 and controls transmission unit 204 and reception unit 206. More specifically, transmission/reception control unit 202, on receiving a transmission request from reception unit 206, reads the user information stored in storage unit 210 and outputs the read user information to transmission unit 204.

The functions of transmission unit 204 and reception unit 206 are the same as those of the above-described transmission unit 154 and reception unit 156, respectively, and therefore, the detailed description thereof will not be repeated.

Electrode 208 is made of, for example, an electrically-conductive resin and is disposed such that, when the user wears portable device 200, electrode 208 contacts the user's skin.

Storage unit 210 is a nonvolatile memory and stores the user information which will be described later.

Further, portable device 200 may be either of an active type or of a passive type. That is, portable device 200 may incorporate a battery (not shown) and may perform human-body communication using electric power from this battery or alternatively, it may extract, as electric power, a portion of the signal from human-body communication unit 150 in MFP 100 and may perform human-body communication using the extracted electric power.

Further, the basic hardware for human-body communication is well known and therefore will not be described in more detail.

(Configuration of Operation Panel)

Figure 4:
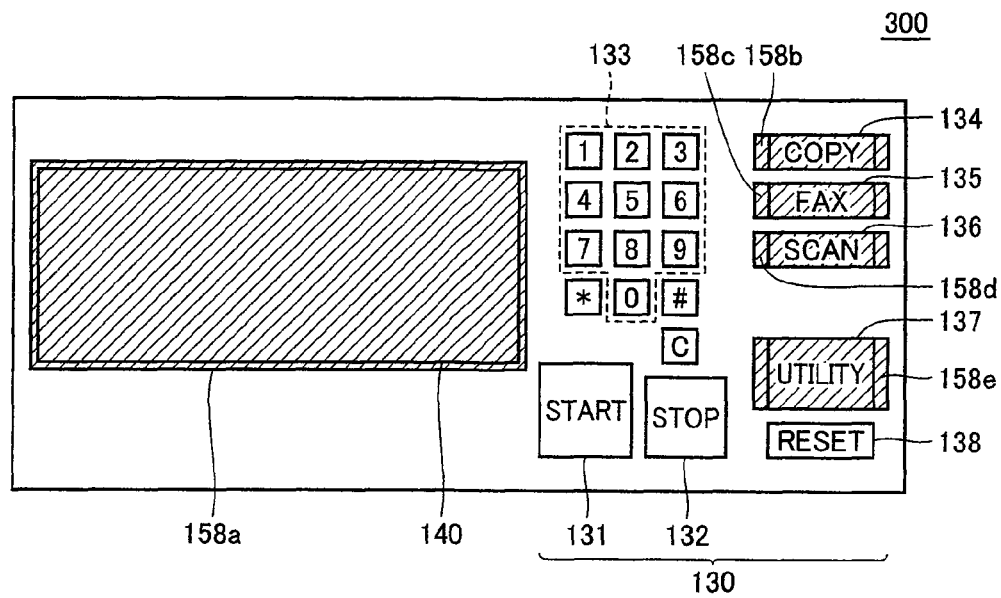
FIG. 4 is a schematic view illustrating the appearance of an operation panel illustrated in FIG. 2.

Referring to FIG. 4, operation unit 300 includes touch panel 140 and key input unit 130 which are arranged on the same flat surface. Key input unit 130 includes, for example, a START key 131, a STOP key 132, numeric keys 133, a COPY key 134, a FAX key 135, a SCAN key 136, a utility key 137, and a reset key 138. START key 131 receives a command for start of the function being selected, and STOP key 132 receives a command for interruption of the function being executed. Numeric keys 133 receive an input of the number of copies, and the like. COPY key 134, FAX key 135 and SCAN key 136 receive commands for selections of the copying function, the facsimile function and the image reading function, respectively. Utility key 137 receives commands for functions other than the above-described functions and various types of settings. Reset key 138 receives a command for reset of the content being selected.

Particularly, in operation panel 300 according to the present embodiment, touch panel 140 and key input unit 130 are provided with electrodes 158 (158a to 158e) for human-body communication, on their surfaces which are touched by a user in order to perform user authentication at the same time when a user presses (operates) operation panel 300. These electrodes 158 are electrically connected to transmission unit 154 and reception unit 156 (both of which are illustrated in FIG. 3).

That is, when a user presses touch panel 140 or the keys provided with electrodes 158, the function corresponding to the user's command corresponding to this pressing is identified, and user authentication is performed, based on the user information stored in portable device 200 worn by the user who has performed this pressing. This enables determining whether or not the use of the commanded function is allowed every time a user performs pressing, without bothering the user.

Figure 5:
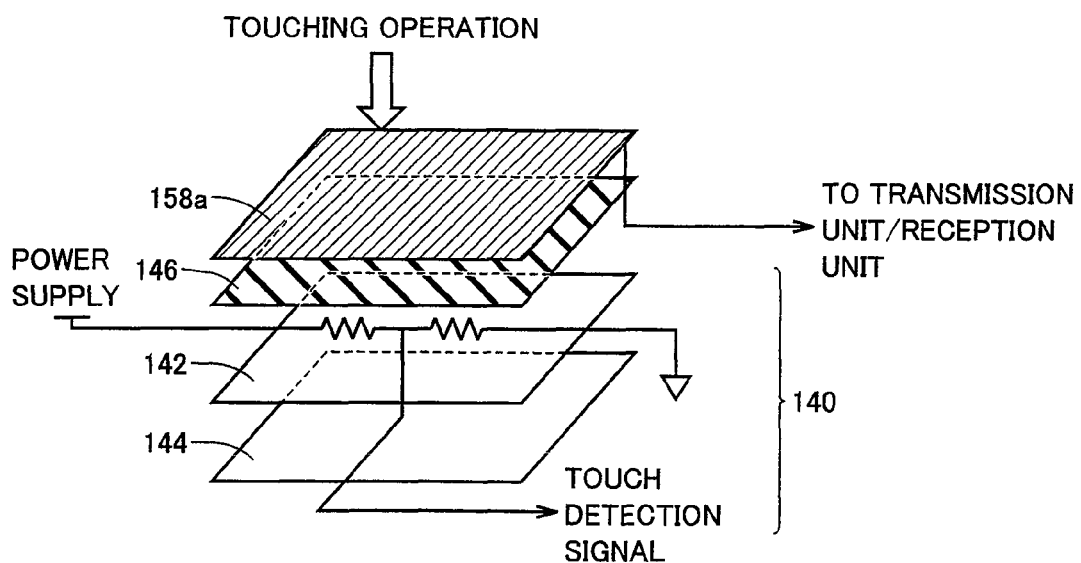
FIG. 5 is an exploded view of a touch panel illustrated in FIG. 4.

Referring to FIG. 5, touch panel 140 includes a pair of conductive sheets 142 and 144 disposed opposite each other, such that a spacer (not shown) is interposed therebetween. A predetermined voltage is applied between opposite ends of upper conductive sheet 142, while a plurality of dots (protrusions) (not shown) are formed in the form of a matrix on the surface of lower conductive sheet 144. The number of dots is determined according to the accuracy of the detection of touching operations by a user. When a user presses touch panel 140, this physically brings upper conductive sheet 142 and lower conductive sheet 144 into contact with each other at the pressed position. At this time, the electric resistance between conductive sheet 142 and conductive sheet 144 is detected in a two-dimensional manner to detect the position at which the user has performed the touching operation. This detected touched position (coordinates) is outputted to control unit 110 (FIG. 2), as a touch detection signal.

In touch panel 140 according to the present embodiment, in addition to the structure of a general touch panel, electrode 158a made of a transparent conductive sheet is laminated on its surface which is touched by a user, with a transparent insulation sheet 146 interposed therebetween. This electrode 158a is electrically connected to transmission unit 154 and reception unit 156 (both of which are illustrated in FIG. 3).

Figure 6:
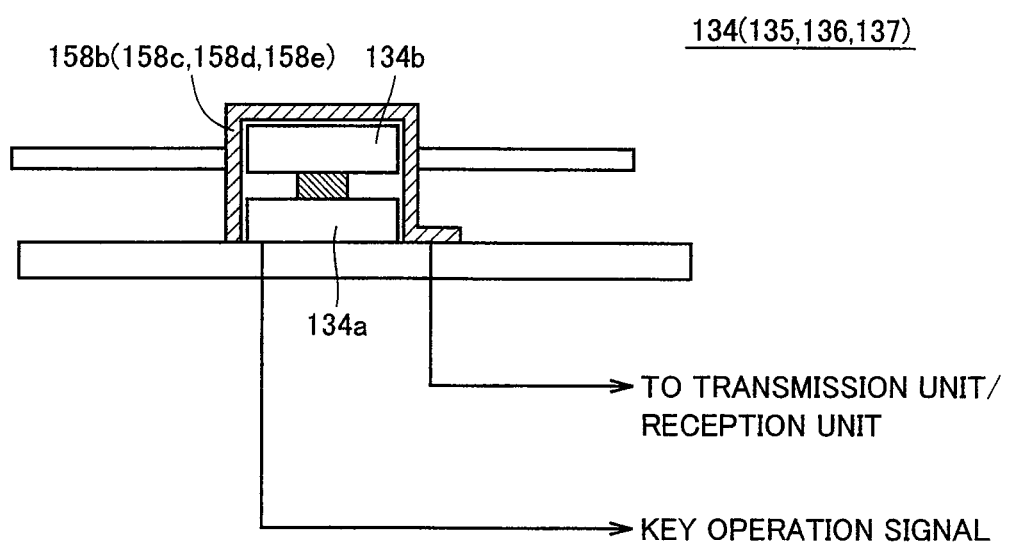
FIG. 6 is a cross-sectional view of a COPY key which is a constituent of a key input unit illustrated in FIG. 4.

Referring to FIG. 6, COPY key 134 includes a detection switch 134a, and a key top 134b mechanically coupled to detection switch 134a. When this key top 134b is pressed by a user, this key top 134b is moved in the downward direction in the paper plane, thereby changing the state of detection switch 134a from the opened state to a closed state. Due to a change in circuit state, a key operation signal indicative of the fact that the user has performed pressing is outputted to control unit 110 (FIG. 2). Further, detection switch 134a and key top 134b are covered with electrode 158b, in their entirety including the surface which is touched by a user. This electrode 158b is made of a conductive resin or rubber, such that it changes its shape according to pressing performed by a user. This electrode 158b is also electrically connected to transmission unit 154 and reception unit 156 (both of which are illustrated in FIG. 3).

Further, FAX key 135, SCAN key 136 and utility key 137 have the same structure as that of COPY key 134 and are covered at their surfaces with electrodes 158c, 158d and 158e, respectively.

Further, although, in the example illustrated in FIG. 4, there has been exemplified the structure in which the electrodes are disposed on the respective surfaces of COPY key 134, FAX key 135, SCAN key 136, and utility key 137, electrodes may be also disposed on the surfaces of other keys.

(User Interface in the Related Art)

At first, there will be described a user interface in the related art as a comparison example, for ease of understanding of the user interface according to the present embodiment.

FIGS. 7A to 7D illustrate an example of a user interface for user authentication in a conventional MFP. Particularly, FIGS. 7A to 7D illustrate a case where user authentication is performed with a password.

At first, before a user (a registered name: AAA) performs an operation, he or she is required to input his or her own password. At this time, touch panel 140 in operation panel 300 is caused to display thereon a form which prompts input of a password, along with a message describing "PLEASE INPUT A PASSWORD". When the user inputs a password by pressing numeric keys 133, it is determined whether or not the inputted password agrees with a pre-registered content. Also, in some cases, the user may be required to input his or her own ID and/or belongingness code, in addition to a password.

Figure 7A:
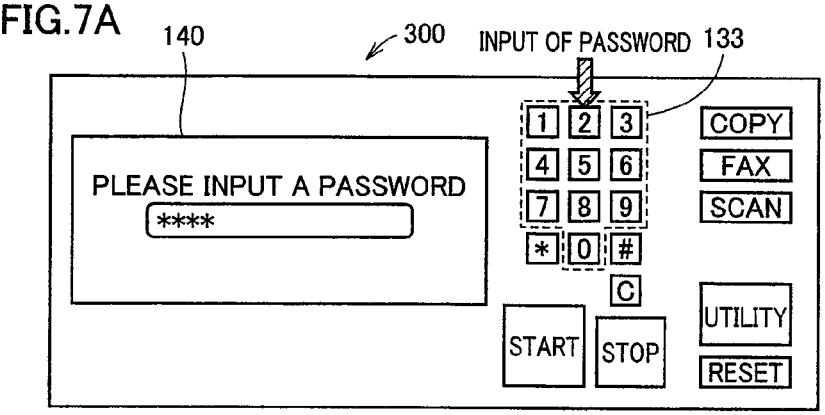
FIGS. 7A to 7D are diagrams illustrating exemplary user interfaces relating to user authentication in the associated MFP.
Figure 7B:
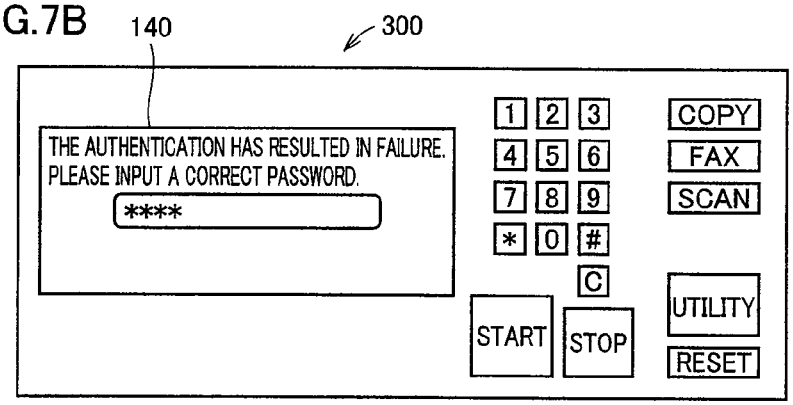

If the inputted password does not agree with the pre-registered content, the authentication results in failure. In this case, as illustrated in FIG. 7B, touch panel 140 in operation panel 300 is caused to display a form which prompts input of a password again, along with a message describing "THE AUTHENTICATION HAS RESULTED IN FAILURE. PLEASE INPUT A CORRECT PASSWORD".

Figure 7C:
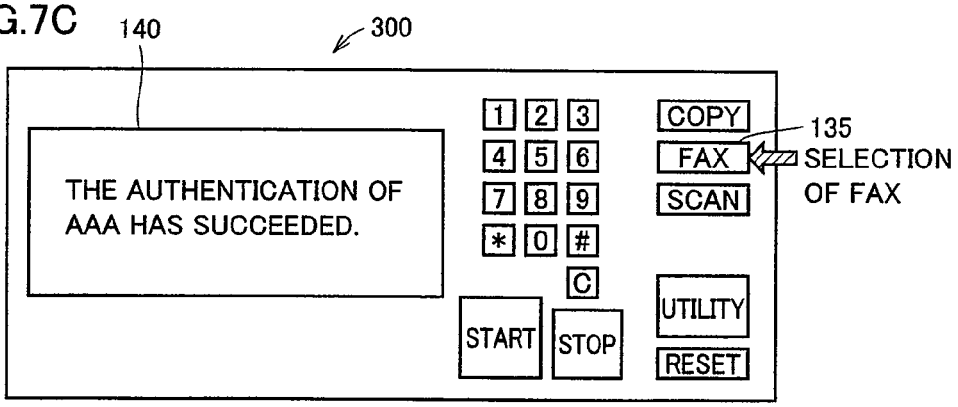

On the other hand, if the inputted password agrees with the pre-registered content, the authentication results in success. In this case, as illustrated in FIG. 7C, touch panel 140 in operation panel 300 is caused to display a message describing "THE AUTHENTICATION OF AAA HAS SUCCEEDED". Further, the pre-registered content includes the name of each user and, based on the registered user name and the like, the name of the user is identified as "AAA".

Figure 7D:
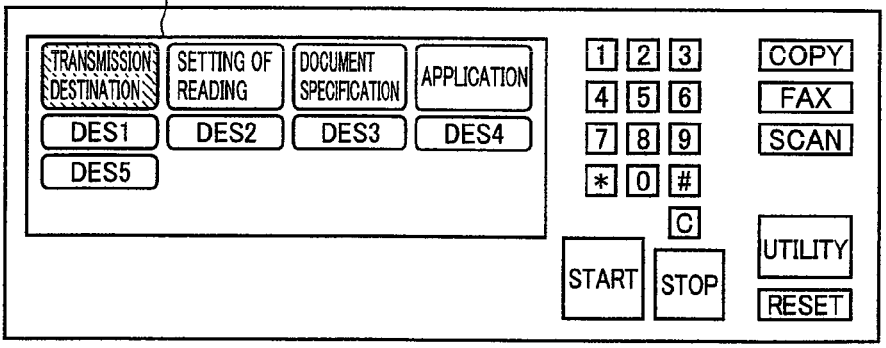

In the state illustrated in FIG. 7C, when the user presses FAX key 135, it changes to a user interface as illustrated in FIG. 7D. Further, it is assumed that the user AAA is allowed to use the facsimile function. In this case, as illustrated in FIG. 7D, touch panel 140 in operation panel 300 is caused to display thereon button images for selection of settings relating to the facsimile function, such as "TRANSMISSION DESTINATION", "SETTING OF READING", "DOCUMENT SPECIFICATION", and "APPLICATION". FIG. 7D illustrates a state where the user has selected "TRANSMISSION DESTINATION" and, in this state, there are together displayed button images for selection of a plurality of transmission destinations which have been previously registered.

As described above, conventional user authentication with a password involves inputting of a password and specifying of jobs after the success of the authentication, as separate operations, which is cumbersome for users. Further, such conventional authentication is based on the premise that, once the authentication has succeeded, only the user who has succeeded in the authentication is allowed to use the MFP exclusively. As a result, in a case where another user wishes to use the MFP, the user who has used it at first is required to log off, which prevents a plurality of users from using the single MFP simultaneously.

User Interface According to First Embodiment

Figure 8A:
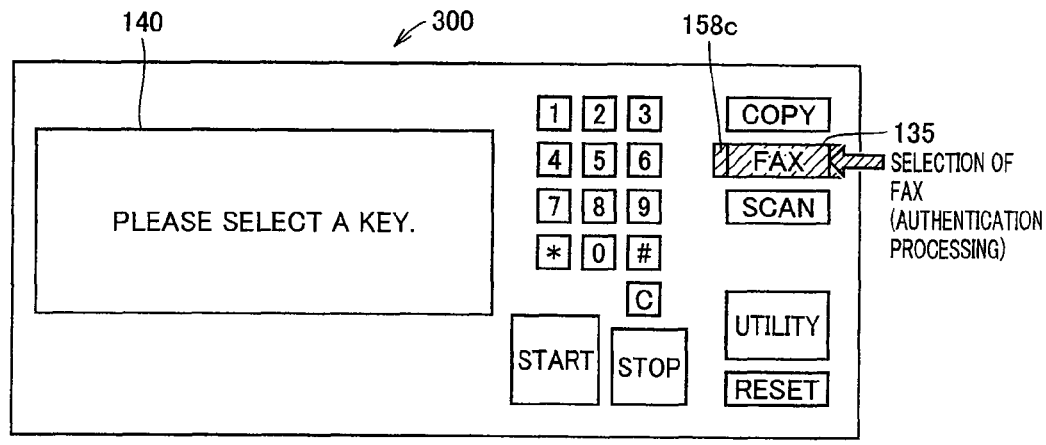
FIGS. 8A to 8C are diagrams illustrating exemplary user interfaces relating to user authentication in the MFP according to the first embodiment.
Figure 8B:
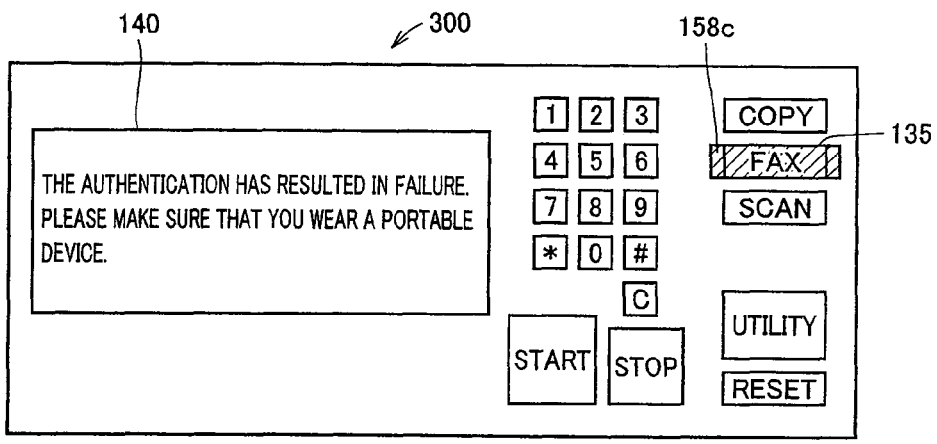
Figure 8C:
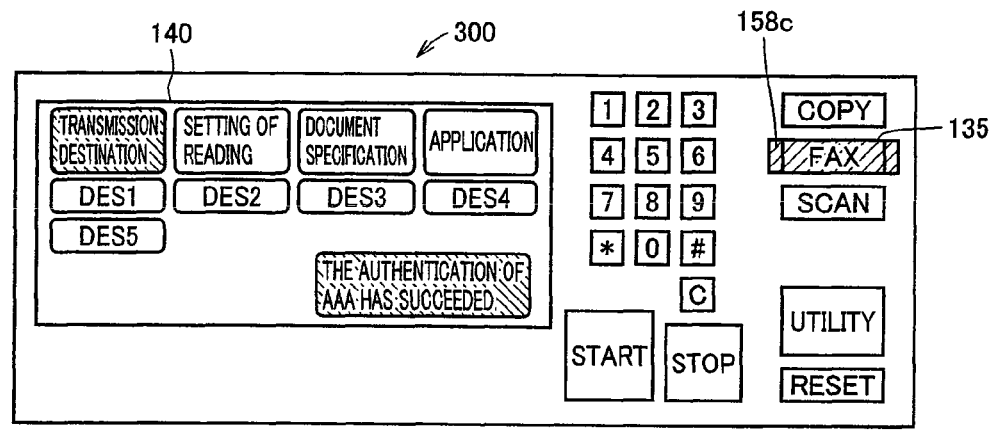

With reference to FIGS. 8A to 8C, there will be described an example of the user interface for user authentication in MFP 100 according to the first embodiment.

MFP 100 according to the present embodiment performs display indicating the fact that MFP 100 stands by for a user's command, without requiring an input of a password or the like. That is, as illustrated in FIG. 8A, touch panel 140 in operation panel 300 is caused to display thereon a message describing "PLEASE SELECT A KEY", in order to prompt a user to perform key inputting. Instead of the way of display illustrated in FIG. 8A, it is possible to display a list of functions which are allowed to execute without performing authentication.

In the state illustrated in FIG. 8A, when a user presses FAX key 135, this creates an electrical path including the user's body and electrode 158c, between portable device 200 worn by the user and MFP 100. MFP 100 starts human-body communication with portable device 200, in response to the pressing of FAX key 135 by the user as a start event.

Then, MFP 100 makes reference to a pre-registered authentication table (which will be described later) and determines whether or not this authentication table includes an entry of user information received from portable device 200. Further, if this authentication table includes such an entry, MFP 100 determines whether or not the use of the function corresponding to the pressed key (the use of the facsimile function in this example) is allowed.

If no user information can be received from portable device 200, if the authentication table includes no entry of the user information received from portable device 200 or if the use of the function corresponding to the pressed key is not allowed, MFP 100 determines that the authentication results in failure and invalidates the user's command. In this case, as illustrated in FIG. 8B, touch panel 140 in operation panel 300 is caused to display thereon a message describing "THE AUTHENTICATION HAS RESULTED IN FAILURE. PLEASE MAKE SURE THAT YOU WEAR A PORTABLE DEVICE". That is, touch panel 140 in operation panel 300 is caused to display thereon a message notifying the user of the fact that use of the commanded function is not allowed, and a message prompting the user to wear portable device 200. Also, the content in the displayed message may be changed between the case where the authentication results in failure because no user information can be received, and the case where the authentication results in failure because the use of the corresponding function is not allowed, while user information can be received.

On the other hand, if the authentication table includes an entry of the user information received from portable device 200 and also the use of the function corresponding to the pressed key is allowed, the authentication results in success. When the authentication results in success, the commanded function is provided to the user. That is, when the authentication results in success, the commanded function is executed.

More specifically, as illustrated in FIG. 8C, touch panel 140 in operation panel 300 is caused to display thereon button images for receiving commands for further detailed functions relating to the facsimile function, such as "TRANSMISSION DESTINATION", "SETTING OF READING", "DOCUMENT SPECIFICATION", and "APPLICATION". FIG. 8C illustrates a state where "TRANSMISSION DESTINATION" has been selected as a default value. In this state, there are also displayed, along therewith, button images for selection of a plurality of transmission destinations which have been previously registered, as information relating to the commanded function. Further, touch panel 140 in operation panel 300 is caused to display thereon a message describing "THE AUTHENTICATION OF AAA HAS SUCCEEDED".

Figure 9A:
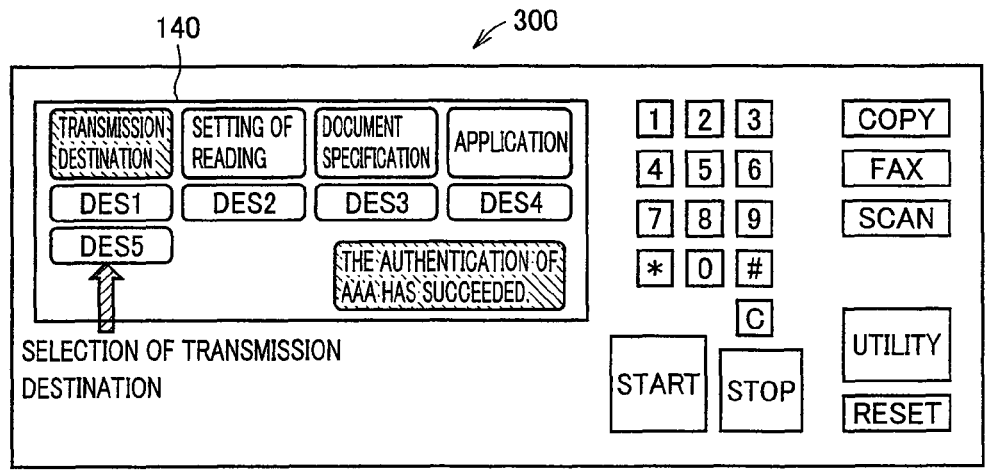
FIGS. 9A to 9C are diagrams illustrating exemplary user interfaces which are displayed subsequently to the user interface illustrated in FIG. 8C.
Figure 9B:
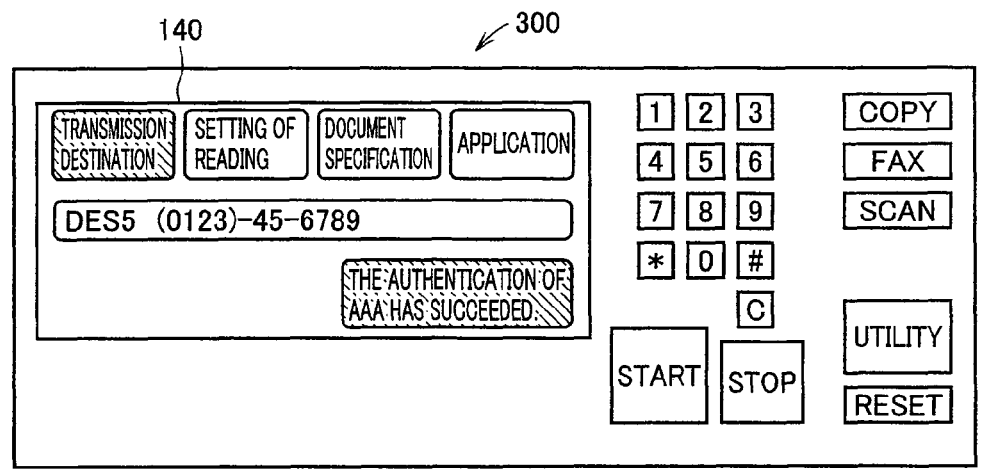
Figure 9C:
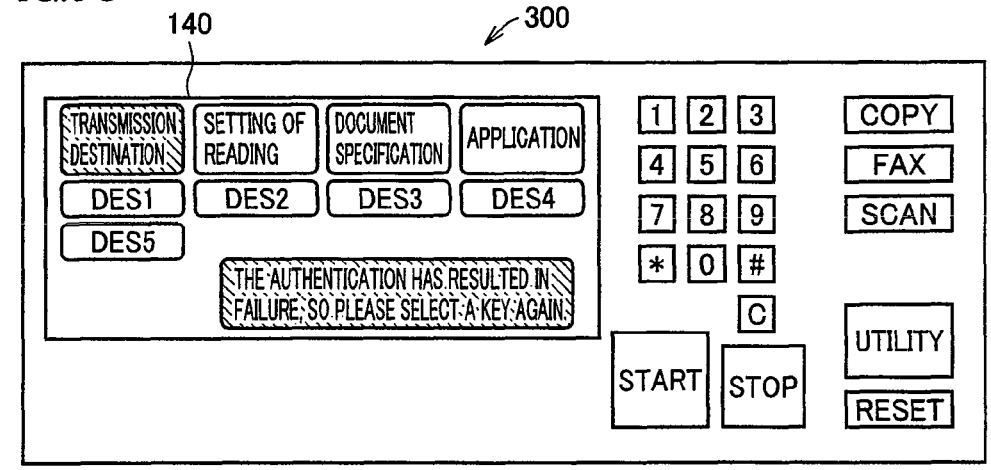

Next, when the user selects any of the transmission destinations through the user interface illustrated in FIG. 8C, then a user interface as illustrated in FIGS. 9A to 9C is displayed.

For example, as illustrated in FIG. 9A, when the user touches "DES5" as one of the transmission destinations, this will create an electrical path including the user's body and electrode 158a (FIG. 4), between portable device 200 worn by the user and MFP 100. Further, MFP 100 determines that "DES5" has been selected, based on the touched position (coordinates) detected by touch panel 140. Then, MFP 100 starts human-body communication with portable device 200, in response to the selection of "DES5" made by the user as a start event. Further, MFP 100 makes reference to the pre-registered authentication table (which will be described later), and determines whether or not facsimile transmission for the transmission destination "DES5" is allowed for the user corresponding to the user information received from portable device 200.

If facsimile transmission for the transmission destination "DES5" is allowed for the user corresponding to the user information received from portable device 200, the authentication results in success. In this case, as illustrated in FIG. 9B, touch panel 140 in operation panel 300 is caused to display thereon detailed information about the transmission destination and other information required for transmission (the phone number of "DES5" in the present example). Further, touch panel 140 in operation panel 300 is also caused to display, along therewith, a message describing "THE AUTHENTICATION OF AAA HAS SUCCEEDED".

If no user information can be received from portable device 200 or if facsimile transmission for the transmission destination "DES5" is not allowed for the user corresponding to the user information received from portable device 200, the authentication results in failure. In this case, as illustrated in FIG. 9C, touch panel 140 in operation panel 300 is caused to display thereon a message describing "THE AUTHENTICATION HAS RESULTED IN FAILURE, SO PLEASE SELECT A KEY AGAIN", and further to display the same operation menu as that displayed before the user selected the transmission destination. That is, touch panel 140 in operation panel 300 is caused to display thereon a message prompting the user to wear portable device 200 and also prompting him or her to select a key again. Further, in FIG. 9C, even if the authentication has resulted in failure, the previous authentication is kept valid or alternatively, all the authentications may be invalidated and the display may be returned to the initial menu as illustrated in FIG. 8A.

As described above, in MFP 100 according to the present embodiment, if a user performs an operation, then authentication is performed concurrently with the reception of this operation. Accordingly, every time a user performs an operation, it is possible to determine whether or not this operation is allowed, without bothering the user. Therefore, after a user is authenticated, another user can be prohibited from operating MFP 100 instead of this user, which can prevent leakage of confidential information.

(Control Structure)

With reference to FIGS. 10 to 13, there will be described a control structure for providing the above-described user interfaces.

Figure 10:
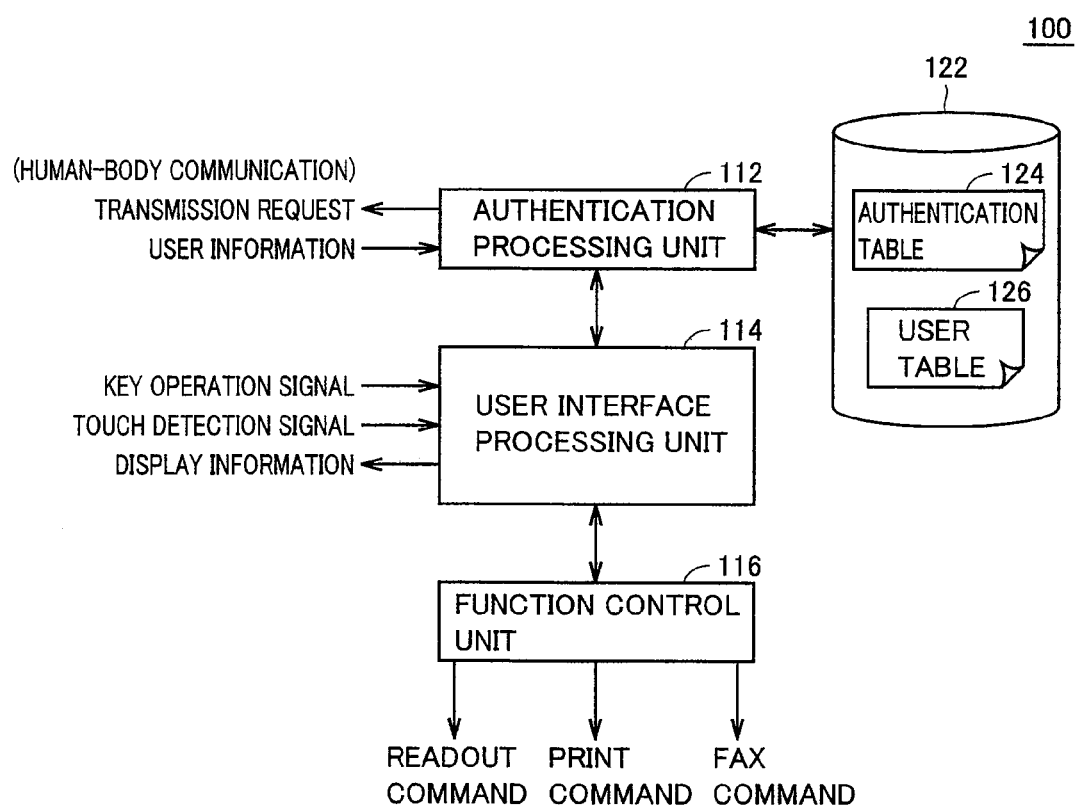
FIG. 10 is a block diagram illustrating the control structure of the MFP according to the first embodiment.

Referring to FIG. 10, the control structure of MFP 100 includes an authentication processing unit 112, a user interface processing unit 114, a function control unit 116, and a table storage unit 122. Authentication processing unit 112, user interface processing unit 114 and function control unit 116 are embodied by the execution of program by control unit 110. Further, table storage unit 122 is embodied in storage unit 120 (FIG. 2).

Authentication processing unit 112 makes reference to an authentication table 124 which has been previously registered in table storage unit 122 and performs authentication processing for the user information received through human-body communication from portable device 200 worn by a user. More specifically, when receiving a start event from user interface processing unit 114, then authentication processing unit 112 transmits a transmission request to portable device 200 and also receives the user information returned therefrom in response to this transmission request. Further, authentication processing unit 112 determines whether or not authentication table 124 includes an entry of the received user information and also determines whether or not the use of the function corresponding to the key pressed by the user is allowed, according to the type of the start event. Further, authentication processing unit 112 returns the result of the authentication to user interface processing unit 114.

In response to operations performed on operation panel 300 by the user, user interface processing unit 114 causes authentication processing unit 112 to perform required authentication processing and also causes touch panel 140 to display thereon various types of operation information, according to the result of the authentication. More specifically, user interface processing unit 114, on receiving a key operation signal and/or a touch detection signal from key input unit 130 and touch panel 140, respectively, determines which of the functions has been selected by the user, based on these signals. Then, user interface processing unit 114 outputs, to authentication processing unit 112, a start event including information indicative of the selected function. Further, user interface processing unit 114 outputs, to touch panel 140, display information for displaying a corresponding screen page, according to the result of the authentication (success or failure of the authentication) from authentication processing unit 112. Further, user interface processing unit 114 commands function control unit 116 to execute the corresponding function, when the authentication results in success.

According to the command received from user interface processing unit 114, function control unit 116 gives a readout command to scanner 170, gives a PRINT command to printing unit 180, and gives a FAX command to facsimile communication unit 190.

Hereinafter, details of data processing will be described.

In the present embodiment, it is assumed that the user information transmitted from portable device 200 worn by a user includes the value of a "USER ID". That is, as illustrated in FIG. 11, the user information transmitted from portable device 200 to MFP 100 includes a field name "USER ID" and the value of the user ID (for example, "00001").

Authentication table 124 includes authentication information which defines whether or not the use of each function incorporated in MFP 100 is allowed, in association with user information. More specifically, as illustrated in FIG. 12, authentication table 124 defines the functions allowed for each of the user IDs, on a per-user-ID basis. Further, in FIG. 12, "Y" indicates that the corresponding function is allowed, while "-" indicates that the corresponding function is not allowed. Further, each of the functions is defined in a hierarchical manner and is classified into three classes of classes 1 to 3, in the example illustrated in FIG. 12. This hierarchical structure corresponds to the order of items included in the operation menus which are displayed on touch panel 140.

As illustrated in FIG. 13, a user table 126 defines user IDs in association with the corresponding user names.

There will be described an example of data processing which is performed by authentication processing unit 112 and user interface processing unit 114, in association with the user interfaces illustrated in FIGS. 8A, 8C, 9A, and 9B.

At first, as illustrated in FIG. 8A, when a user presses FAX key 135, then user interface processing unit 114 outputs, to authentication processing unit 112, a start event including information indicative of the fact that "FAX function" has been selected. It is assumed that, on receiving this start event, authentication processing unit 112 has started human-body communication and has received the user information (user ID="00001") as illustrated in FIG. 11 from portable device 200 worn by the user who has performed this operation.

Then, authentication processing unit 112 at first makes reference to authentication table 124 and determines whether or not there is an entry of the received user ID therein. In the example illustrated in FIG. 12, there exist an entry (124a in FIG. 12) for the user ID "00001", and therefore, authentication processing unit 112 makes reference to the registered content (reference numeral 124b in FIG. 12) corresponding to the "FAX function" selected by the user, out of the functions corresponding to this entry. Authentication processing unit 112 determines that the authentication results in success, if this registered content 124b includes at least a single "Y" indicative of allowance. Then, authentication processing unit 112 outputs, to user interface processing unit 114, the fact of the success of authentication and detailed registered contents (in lower classes) relating to the "FAX function".

Also, authentication processing unit 112 makes reference to user table 126 to acquire the user name corresponding to the received user ID and then outputs the user name to user interface processing unit 114.

On receiving the fact of the success of authentication from authentication processing unit 112, as illustrated in FIG. 8C, user interface processing unit 114 displays an operation menu for a receiving command for further detailed function relating to the "FAX function". Further, user interface processing unit 114 displays a message describing "THE AUTHENTICATION OF AAA HAS SUCCEEDED", using the user name received from authentication processing unit 112.

It is assumed that registered content 124b about the "FAX function" illustrated in FIG. 12 includes a registered content 124c about "TRANSMISSION DESTINATION" in the class 2. This registered content 124c includes "GROUP ABC", "GROUP DEF" and "GROUP GHI" each having transmission destination(s) defined therein. For example, "GROUP ABC" includes "DES1" as a transmission destination, "GROUP DEF" includes "DES2" and "DES3" as transmission destinations, and "GROUP GHI" includes "DES4" and "DES5" as transmission destinations. In this case, in authentication table 124 illustrated in FIG. 12, registered content 124c corresponding to the entry for the user ID "00001" indicates that the use of the corresponding function is allowed for all of "GROUP ABC", "GROUP DEF" and "GROUP GHI", and therefore, as illustrated in FIG. 8C, all the transmission destinations are displayed such that they can be selected.

Subsequently, as illustrated in FIG. 9A, when the user selects "DES5" (a transmission destination included in "GROUP GHI") as one of the transmission destinations, then user interface processing unit 114 outputs, to authentication processing unit 112, a start event including information indicative of the selection of the "FAX function"-"TRANSMISSION DESTINATION"-"GROUP GHI". It is assumed that, on receiving this start event, authentication processing unit 112 has restarted the human-body communication and has received again the user information (user ID="00001") as illustrated in FIG. 11 from portable device 200 worn by the user who has performed this operation.

Then, authentication processing unit 112 makes reference to authentication table 124 again and determines whether or not there is an entry for the received user ID. Further, authentication processing unit 112 makes reference to the registered content (124d in FIG. 12) corresponding to the "FAX function"-"TRANSMISSION DESTINATION"-"GROUP GHI" selected by the user, out of the functions corresponding to this entry. Authentication processing unit 112 determines that the authentication results in success, if this registered content 124d is a reference character of "Y" indicative of allowance. Then, authentication processing unit 112 outputs, to user interface processing unit 114, the fact of the success of authentication, further detailed information relating to the selected "DES5", and the like.

On receiving the fact of the success of authentication from authentication processing unit 112, as illustrated in FIG. 9B, user interface processing unit 114 displays an operation menu including detailed information about the selected "DES5" and other information necessary for transmission.

Further, user interface processing unit 114 commands function control unit 116 to start the execution of the function being selected according to pressing of START key 131 by the user and commands function control unit 116 to interrupt the function being executed according to pressing of STOP key 132 by the user.

(Display Customized to Each User)

As illustrated in the data structure of authentication table 124 illustrated in FIG. 12, it is possible to register any function allowed for each user, out of the functions which can be executed by MFP 100. As a result, even if users press the same key, different operation menu may be displayed on touch panel 140 for each of the users. Hereinafter, there will be described exemplary display contents which are displayed for a user BBB (User ID="00002") and a user CCC (User ID="00003") who are registered in authentication table 124 illustrated in FIG. 12.

Figure 15A:
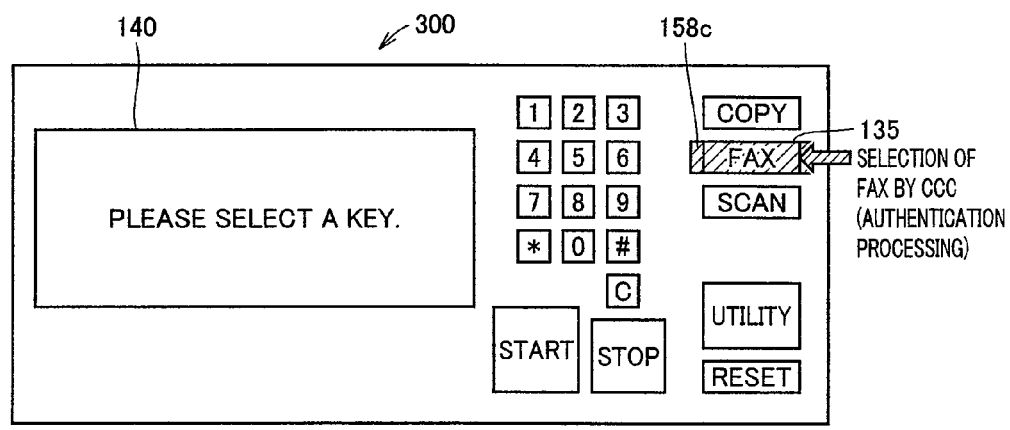
FIGS. 15A and 15B are diagrams illustrating exemplary user interfaces directed to a user registered with a user ID of "00003" in the authentication table illustrated in FIG. 12.
Figure 15B:
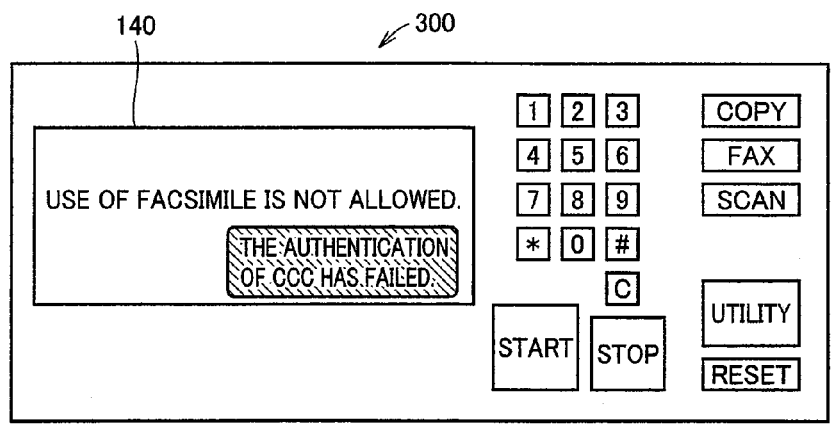

FIGS. 14A and 14B illustrate an exemplary user interface directed for the user who is registered with a user ID of "00002" in authentication table 124 illustrated in FIG. 12. FIGS. 15A and 15B illustrate an exemplary user interface directed for the user who is registered with a user ID of "00003" in authentication table 124 illustrated in FIG. 12.

Referring to FIG. 14A, when user BBB presses FAX key 135, then authentication is performed, based on user information from portable device 200 worn by user BBB. In authentication table 124 illustrated in FIG. 12, the registered content for the "FAX function" for user BBB (User ID="00002") includes "Y" indicative of allowance, and therefore, it is determined that the authentication results in success. In this case, the registered content for the "FAX function"-"TRANSMISSION DESTINATION" for user BBB (User ID="00002") includes "Y" defined only for "GROUP ABC", but the corresponding function is not allowed for the other groups "GROUP DEF" and "GROUP GHI".

Therefore, if user BBB presses FAX key 135, as illustrated in FIG. 14B, the same operation menu as the operation menu illustrated in FIG. 8C is displayed, but only "DES1" included in the allowed "GROUP ABC" is displayed as a transmission destination in such a way that it can be selected.

Referring to FIG. 15A, if user CCC presses FAX key 135, authentication is performed, based on user information from portable device 200 worn by user CCC. In authentication table 124 illustrated in FIG. 12, the registered content for the "FAX function" for user CCC (User ID="00003") does not include "Y" indicative of allowance, and therefore, it is determined that the authentication results in failure.

Then, as illustrated in FIG. 15B, touch panel 140 in operation panel 300 is caused to display thereon a message describing "THE USE OF FACSIMILE IS NOT ALLOWED" and a message describing "THE AUTHENTICATION OF CCC HAS FAILED".

As described above, operation menus with different contents can be provided, according to the registered contents for each of the users who operate MFP 100.

(Processing Procedure)

FIG. 16 is a flowchart illustrating a processing procedure relating to user authentication in MFP 100 according to the first embodiment. The processing procedure illustrated in FIG. 16 is embodied by providing functions as illustrated in FIG. 10 through the execution of program by control unit 110. Further, it is assumed that authentication table 124 (FIG. 11) has been previously registered in storage unit 120 (FIG. 2).

Referring to FIG. 16, in a state where touch panel 140 in operation panel 300 displays thereon operation information which prompts a user to perform key inputting (for example, FIG. 8A), control unit 110 (user interface processing unit 114) determines whether or not key input unit 130 or touch panel 140 has been pressed (step S100). If key input unit 130 or touch panel 140 has not been pressed (NO in step S100), the processing in step S100 is repeated until an operation is performed.

If key input unit 130 or touch panel 140 has been pressed (YES in step S100), control unit 110 (user interface processing unit 114) identifies the commanded function (step S102). That is, control unit 110 (user interface processing unit 114) identifies the commanded function, based on which of the keys a key operation signal has been received from or based on which position (coordinates) on touch panel 140 has been touched.

Then, control unit 110 (user interface processing unit 114) determines whether or not the identified function is to be subjected to authentication (step S104). More specifically, it is determined whether or not the function identified in step S102 corresponds to any function defined in authentication table 124. If the identified function is not to be subjected to authentication (NO in step S104), the processing is returned.

If the identified function is to be subjected to authentication (YES in step S104), control unit 110 (authentication processing unit 112) causes human-body communication unit 150 to start processing for establishing human-body communication with portable device 200 worn by the user (step S106).

Then, control unit 110 (user interface processing unit 114) determines whether or not key input unit 130 or touch panel 140 has been continuously pressed (step S108). This is because, if the user is not touching key input unit 130 or touch panel 140, it is physically impossible to perform human-body communication. If key input unit 130 or touch panel 140 has not been continuously pressed (NO in step S108), the processing is carried forward to step S126.

If key input unit 130 or touch panel 140 has been continuously pressed (YES in step S108), control unit 110 (authentication processing unit 112) determines whether or not human-body communication has been established between human-body communication unit 150 and portable device 200 (step S110). If human-body communication has not been established between human-body communication unit 150 and portable device 200 (NO in step S110), the processing is carried forward to step S126.

If human-body communication has been established between human-body communication unit 150 and portable device 200 (YES in step S110), control unit 110 (authentication processing unit 112) causes human-body communication unit 150 to transmit, to portable device 200, a transmission request for readout of user information therefrom (step S112).

Then, control unit 110 (authentication processing unit 112) determines whether or not it has received user information from portable device 200 (step S114). If no user information has been received from portable device 200 (NO in step S114), the processing is carried forward to step S126.

If user information has been received from portable device 200 (YES in step S114), control unit 110 (authentication processing unit 112) makes reference to authentication table 124 to determine whether or not it includes an entry for the received user information (step S116). If there exist no entry for the received user information (NO in step S116), the processing is carried forward to step S126.

If there exist the entry for the received user information (YES in step S116), control unit 110 (authentication processing unit 112) determines whether or not the use of the function identified in step S102, out of the functions corresponding to the received user information, is allowed (step S118). That is, it is determined whether or not the registered contents of authentication table 124 which correspond to the received user information include at least a single registered content indicative of allowance which is included in the function identified in step S102.

If the use of the function identified in step S102 out of the functions corresponding to the received user information is allowed (YES in step S118), the processing is carried forward to step S120. Otherwise (NO in step S118), the processing is carried forward to step S126.

In step S120, control unit 110 (authentication processing unit 112) determines that the authentication has succeeded. Then, control unit 110 (user interface processing unit 114) obtains the registered contents corresponding to the function identified in step S102, from authentication table 124 (step S122). Further, control unit 110 (user interface processing unit 114) causes touch panel 140 in operation panel 300 to display thereon the fact that the authentication has succeeded as well as information relating to the function corresponding to the pressing (step S124). Thereafter, the processing is returned.

On the other hand, in step S126, control unit 110 (authentication processing unit 112) determines that the authentication has failed. Then, control unit 110 (user interface processing unit 114) causes touch panel 140 in operation panel 300 to display thereon the fact that the authentication has failed and helpful guidance (step S128). Thereafter, the processing is returned.

In the present embodiment, every time a user presses the touch panel or the key, the user information is read from the portable device worn by the user through the electrode disposed on the touched surface. Then, the function corresponding to the user's command corresponding to this pressing is identified, and also, the determination as to whether or not the use of the identified function is allowed is made, based on the user information. This enables performing of authentication for each commanded function, without bothering the user.

Further, in the present embodiment, it is possible to customize the registered contents of the authentication table for each user, which enables displaying of a menu screen page according to the user.

Second Embodiment

In the above-described first embodiment, there has been exemplified a structure for basically allowing a single user to use MFP 100. In a second embodiment which will be described later, there will be exemplified a structure which enables a plurality of users to use an MFP simultaneously.

The functional structure and the like of an MFP 100A according to the present embodiment is the same as those of MFP 100 according to the above-described first embodiment and the detailed description thereof will not be repeated.

User Interfaces According to Present Embodiment

Figure 17A:
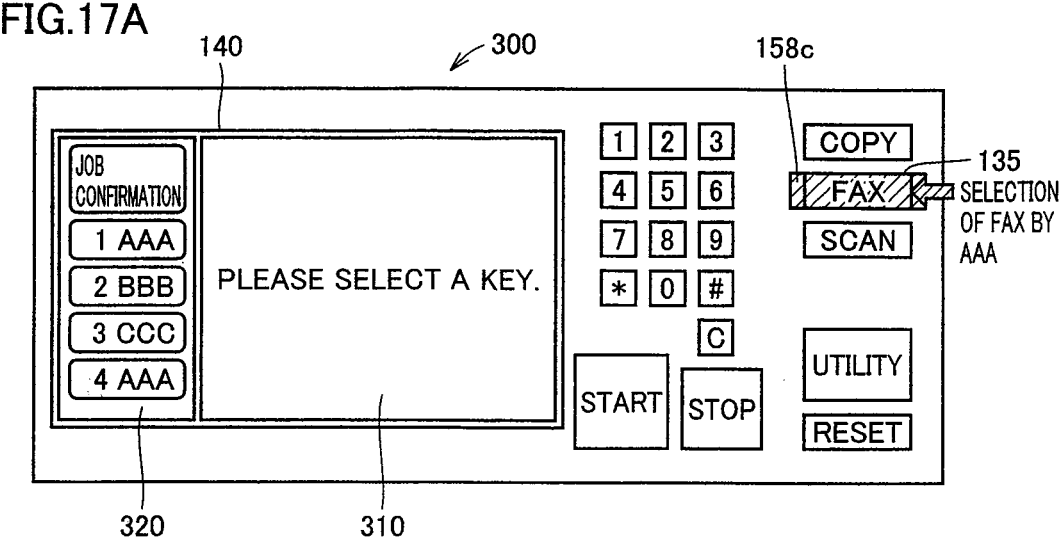
FIGS. 17A to 17C are diagrams illustrating exemplary user interfaces relating to user authentication in an MFP according to a second embodiment.

Referring to FIG. 17A, in MFP 100A according to the present embodiment, a touch panel 140 in an operation panel 300 is caused to display thereon a display area 310 which receives user's commands for various types of functions, and a display area 320 which displays a list of job(s) which are being executed or to be executed in response to commands. That is, in MFP 100A, a plurality of display areas including respective independent operation information are displayed.

Figure 17B:
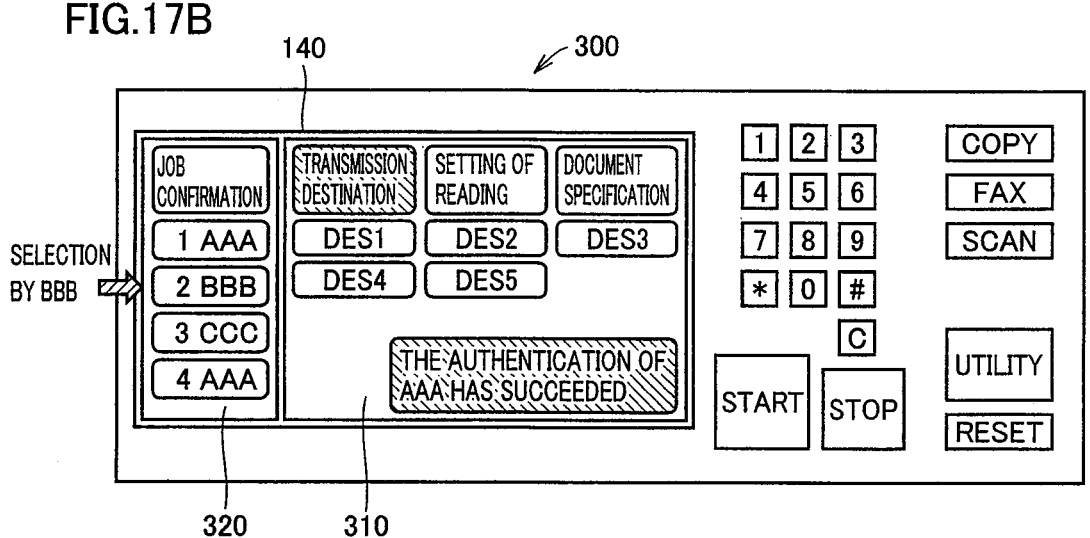

The contents of the display on display area 310 are similar to the contents of the display on touch panel 140 according to the above-described first embodiment (see FIGS. 8A to 8C). That is, when a user AAA presses a FAX key 135, as in the manner described above, authentication processing is executed, based on user information from a portable device 200 worn by a user AAA. When the authentication succeeds, an operation menu as illustrated in FIG. 17B is displayed.

Display area 320 displays thereon a list of jobs (processes) commanded by users, along with the respective names of the user(s) (hereinafter, also referred to as "owner" or "owners") who commanded the jobs. Further, display area 310 and display area 320 are formed in the common touch panel 140 such that they partition its display area, and it is not necessary that touch panel 140 is physically partitioned into two parts.

Figure 17C:
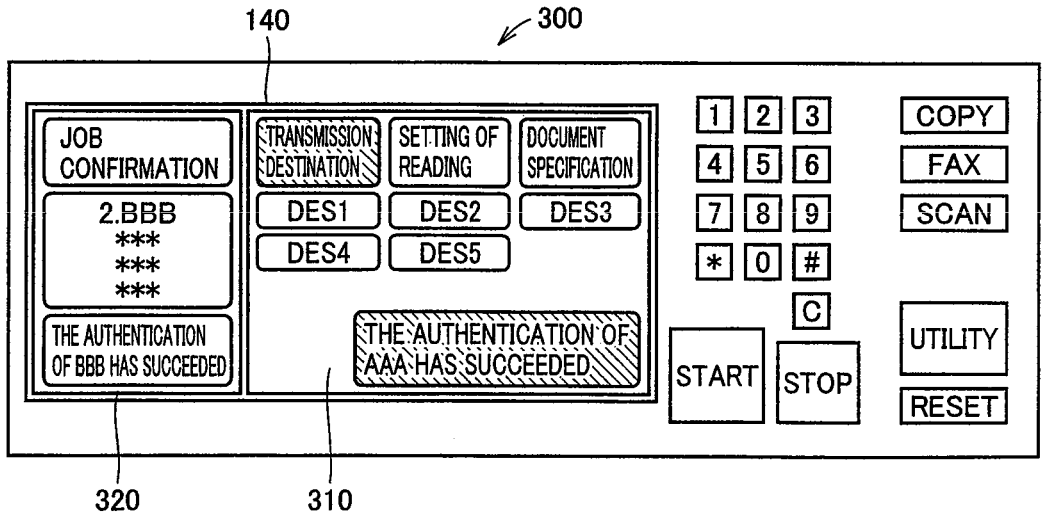

In the state illustrated in FIG. 17C, when a user BBB selects a job which was commanded by himself or herself, out of the jobs being displayed in display area 320, authentication processing is executed based on user information from a portable device 200 worn by user BBB. Then, when the authentication succeeds, information about detailed contents of the selected job and the status of the execution of the selected job are displayed, as illustrated in FIG. 17C. The authentication processing which is executed in response to the pressing of display area 320 by the user is the same as the authentication processing according to the above-described first embodiment. However, the determination as to whether the authentication succeeds or fails is made, based on whether or not the user information received from portable device 200 agrees with the owner of the selected job. Accordingly, in performing authentication regarding the list of jobs, no authentication table 124 is used, but owner information about respective jobs is used.

(Control Structure)

With reference to FIG. 18, there will be described a control structure for providing the above-described user interface.

Referring to FIG. 18, the control structure of MFP 100A according to the present embodiment corresponds to the control structure of MFP 100 according to the above-described first embodiment, but it is additionally provided with an authentication processing unit 112A instead of authentication processing unit 112 and is further provided with a job management unit 118.

Job management unit 118 manages the processing which is executed by scanner 170, printing unit 180, facsimile communication unit 190, and the like, according to commands from a function control unit 116. More specifically, job management unit 118 successively stores, in its own memory area (not shown), job commands transmitted from a user interface processing unit 114 to function control unit 116, and also successively deletes, from this memory area, the jobs which have been executed by scanner 170, printing unit 180, facsimile communication unit 190, and the like. Further, job management unit 118 stores the jobs transmitted from user interface processing unit 114, in association with their respective owners.

User interface processing unit 114 determines which of display area 310 and display area 320 has been selected, every time a user performs a touching operation on touch panel 140. Further, user interface processing unit 114 identifies the function commanded through the selected display area, based on the detected touched position (coordinates).

According to user's commands generated to the selected one of display areas 310 and 320, authentication processing unit 112A performs authentication based on the user information, independently of user's commands generated to the other one of display areas 310 and 320. That is, if a user presses display area 310, authentication processing unit 112A performs the same authentication processing as that of authentication processing unit 112 according to the above-described first embodiment. On the other hand, if a user presses display area 320, authentication processing unit 112A performs authentication processing, by making reference to job information stored in job management unit 118.

More specifically, authentication processing unit 112A identifies the owner of the selected job, by making reference to the memory area in job management unit 118, and determines whether or not this owner agrees with the user information received from portable device 200. Then, authentication processing unit 112A returns the result of the authentication to user interface processing unit 114. According to the result of the authentication, user interface processing unit 114 updates the display in display area 320.

The other parts are the same as those of the control structure according to the above-described first embodiment and the detailed description thereof will not be repeated.

According to the present embodiment, even when a plurality of users use a single MFP simultaneously, it is possible to perform authentication for each of the users and for each of the functions, without bothering the users.

Third Embodiment

In the above-described first embodiment, there has been exemplified a structure for defining the function(s) which is/are allowed to be used, on a per-user basis. On the contrary, in the present embodiment, there will be exemplified a structure capable of defining the function(s) which is/are allowed to be used, on a per-group basis.

Referring to FIG. 19, in the third embodiment, it is assumed that user information includes the value of a "USER ID" and the value of an "ATTRIBUTE". The "USER ID" is identification information which identifies the user who wears a portable device 200, and the "ATTRIBUTE" is identification information which identifies the group to which each user belongs.

Referring to FIG. 20, an authentication table according to the third embodiment corresponds to authentication table 124 (FIG. 12) according to the above-described first embodiment, but the authentication table defines each function allowed in association with "ATTRIBUTE", instead of "USER ID".

The MFP according to the present embodiment, on receiving user information from portable device 200, performs authentication processing, based on the value of "ATTRIBUTE" included in this user information. With this structure, the MFP is made suitable for operations for allowing a common function for a group to which a plurality of users belong. That is, it is possible to allow the common function for users who belong to the same group, by assigning the same "ATTRIBUTE" to these users.

It is also assumed that a user who has belonged to a group may leave this group. In this case, in order to restrict the use of the MFP by a certain user, it is also possible to employ an access-privilege setting table as illustrated in FIG. 21. More specifically, the MFP according to the present embodiment, on receiving user information from portable device 200, determines whether or not an access privilege is granted for the value of "USER ID" included in this user information, by making reference to the access-privilege setting table. Only in the case where the access privilege is granted, the MFP allows the use thereof.

The other structures and processing are the same as those of the above-described first embodiment and the detailed description thereof will not be repeated.

Fourth Embodiment

In the above-described first embodiment, there has been exemplified a structure which uses user information including only a user ID. However, it may employ a structure capable of improving security.

Referring to FIG. 22, in the fourth embodiment, it is assumed that user information includes the value of a "USER ID" and the value of a "PASSWORD". The "USER ID" is identification information which identifies the user who wears a portable device 200, and the "PASSWORD" is data issued to a certain user and may be updated regularly.

Referring to FIG. 23, an authentication table according to the fourth embodiment corresponds to authentication table 124 (FIG. 12) according to the above-described first embodiment, but a condition about the "PASSWORD" is imposed on a certain function ("GROUP GHI" in "TRANSMISSION DESTINATION", in the example of FIG. 23).

The MFP according to the present embodiment, on receiving user information from portable device 200, performs authentication processing, based on the value of "USER ID" included in this user information. In this case, for the item for which the condition about "PASSWORD" is imposed, if the value of "PASSWORD" for this item does not agree with the value of "PASSWORD" included in the user information, it is determined that the authentication results in failure. Alternatively, if it does not agree with the value of "PASSWORD" included in the user information, the item of interest is not displayed on a touch panel 140 in an operation panel 300.

With this structure, even if a "USER ID" is stolen through an unauthorized way, it is possible to prevent leakage of confidential information, for the item protected with the password.

The other structures and processing are the same as those of the above-described first embodiment and the detailed description thereof will not be repeated.

Fifth Embodiment

There may be cases where a document in a specific format is required to be transmitted, depending on, for example, the transmission destination for facsimile transmission. In this case, if the format of a created document can be previously specified, and only the transmission destination to which a document in this format can be transmitted can be selectively displayed, it is possible to improve the usability. In the present embodiment, there will be exemplified a structure for managing the format and fixed form of a created document by means of a JOB registration code.

Referring to FIG. 24, in the fifth embodiment, it is assumed that user information includes the value of a "USER ID" and the value of a "JOB REGISTRATION CODE". The "USER ID" is identification information which identifies the user who wears a portable device 200, and the "JOB REGISTRATION CODE" is for use in previously registering, e.g., the format of document and the like created by each user.

Referring to FIG. 25, an authentication table according to the fifth embodiment corresponds to authentication table 124 (FIG. 12) according to the above-described first embodiment, but a condition about "JOB REGISTRATION CODE" is imposed on a certain function ("GROUP ABC" and "GROUP GHI" in "TRANSMISSION DESTINATION", in the example of FIG. 23).

The MFP according to the present embodiment, on receiving user information from portable device 200, performs authentication processing, based on the value of "USER ID" included in this user information. In this case, for the item for which the condition about "JOB REGISTRATION CODE" is imposed, if the value of "JOB REGISTRATION CODE" for this item does not agree with the value of "JOB REGISTRATION CODE" included in the user information, this item is not displayed on a touch panel 140 in an operation panel 300.

With this structure, it is possible to prevent occurrence of mistakes such as transmission of a document in a different format from the specified format.

Further, in the present embodiment, the JOB registration code stored in the portable device worn by a user may be frequently changed. Therefore, preferably, the storage unit of the portable device is provided with a secure area having contents which cannot be changed without performing a special procedure, and a regular area having contents which can be easily changed, and the "USER ID" is stored in the secure area, and the "JOB REGISTRATION CODE" is stored in the regular area.

The other structures and processing are the same as those of the above-described first embodiment and the detailed description thereof will not be repeated.

Other Embodiments

A program which is executed by the control unit and the like according to the present embodiments may be adapted to call, in a predetermined arrangement and at a predetermined timing, a necessary module, out of program modules provided as part of an operating system (OS) for a computer, and to cause these modules to execute processing. In this case, the program itself does not include the module(s) and executes processing in cooperation with the OS. Such a program including no module may be also included in the program according to the present invention.

Further, the functions which are realized by the program according to the present invention may be partially or entirely configured by dedicated hardware.

(Other Aspects of the Invention)

According to a preferable aspect of the present invention, providing the commanded function to the user includes executing the commanded function.

According to another preferable aspect of the present invention, providing the commanded function to the user includes displaying, on the display unit, information relating to the commanded function.

According to another preferable aspect of the present invention, providing the commanded function to the user includes enabling inputting of a command for a further detailed function relating to the commanded function.

According to another preferable aspect of the present invention, invalidating the user's command includes displaying, on the display unit, the fact that the use of the commanded function is not allowed.

According to another preferable aspect of the present invention, the input unit is configured integrally with the display unit, and the display unit displays a plurality of display areas each including independent operation information. The control unit is further operative to determine whether or not which of the plurality of display areas has been selected when the user touches the input unit, and to perform authentication based on the user information, according to the operation information corresponding to the selected display area, independently of the user's command generated to the other display area.

An authentication method according to another preferable aspect of the present invention further includes the steps of determining whether or not which of the plurality of display areas has been selected when the user touches the input unit, and performing authentication based on the user information, according to the operation information corresponding to the selected display area, independently of the user's command generated to the other display area.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image forming apparatus comprising:
a display unit displaying operation information;
an input unit receiving a user's command to use a function of the image forming apparatus in response to touching thereon by the user;
an electrode disposed on a surface of said input unit to be touched by the user;
a human-body communication unit electrically connected to said electrode, said human-body communication unit being adapted to read user information from a portable device worn by the user, in response to the user's input of a command for a function, wherein said human-body communication unit reads again the user information from the portable device when the user inputs a command for a different function;
a storage unit storing authentication information defining whether or not use of each function incorporated in said image forming apparatus is allowed, in association with said user information; and
a control unit, wherein
said control unit is operative to:
identify a commanded function and read said user information from said portable device, when said user's command is inputted,
determine whether or not the use of said identified commanded function is allowed for said user information read from said portable device worn by the user who inputted said command, by making reference to said authentication information, provide said commanded function to the user, when the use of said commanded function is allowed, and
invalidate said user's command, when the use of said commanded function is not allowed; and wherein
said input unit is configured integrally with said display unit,
said display unit displays a plurality of display areas each including independent operation information and authentication, and said control unit is further operative to:
   determine whether or not which of said plurality of display areas has been selected when the user touches said input unit, and
   perform authentication based on said user information, according to the operation information corresponding to said selected display area, independently of the user's command generated to the other display area.

2. The image forming apparatus according to claim 1, wherein
the providing said commanded function to the user includes executing said commanded function.

3. The image forming apparatus according to claim 1, wherein
the providing said commanded function to the user includes displaying, on said display unit, information relating to said commanded function.

4. The image forming apparatus according to claim 1, wherein
the providing said commanded function to the user includes enabling inputting of a command for a further detailed function relating to said commanded function.

5. The image forming apparatus according to claim 1, wherein
the invalidating said user's command includes displaying, on said display unit, the fact that the use of said commanded function is not allowed.

6. A method for authentication in an image forming apparatus, the method comprising the steps of:
   providing authentication information defining whether or not use of each function incorporated in the image forming apparatus is allowed, in association with user information;
   displaying operation information on a display unit;
   receiving a user's command to use a function of the image forming apparatus in response to touching on an input unit by the user;
   reading user information from a portable device worn by the user, through an electrode disposed on a surface of said input unit to be touched by the user, in response to the user's input of a command for a function, wherein the reading of the user information is repeated when the user inputs a command for a different function;
   identifying a commanded function when said user's command is inputted;
   determining whether or not the use of said identified commanded function is allowed for said user information read from said portable device worn by the user who inputted said command, by making reference to said authentication information;
   providing said commanded function to the user, when the use of said commanded function is allowed; and
   invalidating said user's command, when the use of said commanded function is not allowed; and wherein
   said input unit is configured integrally with said display unit,
   said display unit displays a plurality of display areas each including independent operation information and each requiring authentication, and
   the authentication method further comprises the steps of:
   determining whether or not which of said plurality of display areas has been selected when the user touches said input unit, and
   performing authentication based on said user information, according to the operation information corresponding to said selected display area, independently of the user's command generated to the other display area.

7. The authentication method according to claim 6, wherein
the providing said commanded function to the user includes executing said commanded function.

8. The authentication method according to claim 6, wherein
the providing said commanded function to the user includes displaying, on said display unit, information relating to said commanded function.

9. The authentication method according to claim 6, wherein
the providing said commanded function to the user includes enabling inputting of a command for a further detailed function relating to said commanded function.

10. The authentication method according to claim 6, wherein
the invalidating said user's command includes displaying, on said display unit, the fact that the use of said commanded function is not allowed.

* * * * *